US012795419B2

(12) United States Patent
Feng et al.

(10) Patent No.: US 12,795,419 B2
(45) Date of Patent: Nov. 10, 2026

(54) COMMUNICATION METHOD, COMMUNICATION APPARATUS, AND COMMUNICATION SYSTEM

(71) Applicant: HUAWEI TECHNOLOGIES CO., LTD., Shenzhen (CN)

(72) Inventors: Zhao Feng, Shanghai (CN); Yang Xin, Shanghai (CN); Runze Zhou, Shanghai (CN); Yuan Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 290 days.

(21) Appl. No.: 18/629,027

(22) Filed: Apr. 8, 2024

(65) Prior Publication Data

US 2024/0259846 A1 Aug. 1, 2024

Related U.S. Application Data

(63) Continuation of application No. PCT/CN2022/121641, filed on Sep. 27, 2022.

(30) Foreign Application Priority Data

Oct. 9, 2021 (CN) .......................... 202111174672.0

(51) Int. Cl.
*H04W 24/10* (2009.01)
*H04W 24/08* (2009.01)

(52) U.S. Cl.
CPC .................................. *H04W 24/08* (2013.01)

(58) Field of Classification Search
CPC ..... H04W 24/08; H04W 24/02; H04W 24/04; H04W 24/10
See application file for complete search history.

(56) References Cited

U.S. PATENT DOCUMENTS

2016/0142872 A1 5/2016 Nicholson et al.
2020/0288296 A1* 9/2020 Fiorese .................. G06N 5/046
(Continued)

FOREIGN PATENT DOCUMENTS

CN 113518354 A 10/2021
WO 2020231117 A1 11/2020
WO 2021008270 A1 1/2021

OTHER PUBLICATIONS

European Search Report dated Dec. 2, 2024 in European Application No. EP22877874.2, 12 pages.
(Continued)

*Primary Examiner* — Barry W Taylor

(57) ABSTRACT

This application provides a communication method, a communication apparatus, and a communication system. The method includes a data analytics network element receiving a request message from a core network element or a third-party network element, where the request message is used to request an analytics result. The data analytics network element sends, to the core network element or the third-party network element, block information and an analytics result corresponding to the block information, where a coverage area of a block corresponding to the block information is smaller than a coverage area of a cell. In this solution, the data analytics network element provides the core network element or the third-party network element with an analytics result at a block granularity that is finer than a cell granularity, so that a more refined operation based on the analytics result at the block granularity can be performed.

20 Claims, 7 Drawing Sheets

(56) References Cited

U.S. PATENT DOCUMENTS

| | | | | |
|---|---|---|---|---|
| 2021/0314906 | A1* | 10/2021 | Matolia | H04W 24/10 |
| 2023/0047537 | A1* | 2/2023 | Sridhar | H04W 24/02 |
| 2026/0046212 | A1* | 2/2026 | Xin | H04L 41/14 |

OTHER PUBLICATIONS

PCT International Search Report for Application No. PCT/CN2022/121641 dated Oct. 9, 2021, 97 pages.

3rd Generation Partnership Project; Technical Specification Group Services and System Aspects; Architecture enhancements for 5G System (5GS) to support network data analytics services (Release 17). 3GPP TS 23.288 V17.2.0 (Sep. 2021). total 195 pages.

3rd Generation Partnership Project; Technical Specification Group Services and System Aspects; Architecture enhancements to facilitate communications with packet data networks and applications (Release 17). 3GPP TS 23.682 V17.0.0 (Jun. 2021). total 135 pages.

3rd Generation Partnership Project; Technical Specification Group Services and System Aspects; Management and orchestration; 5G end to end Key Performance Indicators (KPI) (Release 17). 3GPP TS 28.554 V17.4.0 (Sep. 2021). total 44 pages.

3rd Generation Partnership Project; Technical Specification Group Radio Access Network; Universal Terrestrial Radio Access (UTRA), Evolved Universal Terrestrial Radio Access (E-UTRA) and Next Generation Radio Access; Radio measurement collection for Minimization of Drive Tests (MDT); Overall description; Stage 2 (Release 16). 3GPP TS 37.320 V16.6.0 (Sep. 2021). total 34 pages.

NTT DOCOMO:"Analytics based on more precise UE location information."3GPP TSG-SA2 Meeting #145e, May 17-May 28, 2021, eMeeting. S2-2104425, total 3 pages.

* cited by examiner

COMMUNICATION METHOD, COMMUNICATION APPARATUS, AND COMMUNICATION SYSTEM

CROSS-REFERENCE TO RELATED APPLICATIONS

This application continuation of International Application No. PCT/CN2022/121641, filed on Sep. 27, 2022, which claims priority to Chinese Patent Application No. 202111174672.0, filed on Oct. 9, 2021. The disclosures of the aforementioned applications are hereby incorporated by reference in their entireties.

TECHNICAL FIELD

This application relates to the field of communication technologies, and in particular, to a communication method, a communication apparatus, and a communication system.

BACKGROUND

Currently, in some application scenarios, a status of a cell or a tracking area needs to be analyzed, so that a corresponding decision is made based on an analytics result. However, an existing analytics result cannot meet requirements of some services. For example, in a vehicle-to-everything application, a vehicle-to-everything application server controls autonomous driving of a vehicle via a network (for example, a 5th generation (5G) network). Because autonomous driving has an extremely high security requirement, a current analytics result cannot meet a requirement of the vehicle-to-everything application.

SUMMARY

Embodiments of this application provide a communication method, a communication apparatus, and a communication system, to provide an analytics result at a block granularity that is finer than a cell granularity.

According to a first aspect, an embodiment of this application provides a communication method. The method may be performed by a data analytics network element or a module (for example, a chip) used in the data analytics network element. An example in which the data analytics network element performs the method is used. The method includes: The data analytics network element receives a request message from a core network element or a third-party network element, where the request message is used to request an analytics result. The data analytics network element sends, to the core network element or the third-party network element, block information and an analytics result corresponding to the block information, where a coverage area of a block corresponding to the block information is smaller than a coverage area of a cell.

According to the foregoing solution, the data analytics network element provides the core network element or the third-party network element with an analytics result at a block granularity that is finer than a cell granularity, so that the core network element or the third-party network element can perform a more refined operation based on the analytics result at the block granularity.

In a possible implementation method, the request message includes identification information of a first terminal device, and the request message is specifically used to request an analytics result of the first terminal device. The data analytics network element obtains location information of the first terminal device from a location management network element. The data analytics network element determines the block information based on step information and the location information of the first terminal device, where the first terminal device is located in the coverage area of the block corresponding to the block information.

According to the foregoing solution, the block information of the block in which the first terminal device is located may be determined, so that an analytics result of a terminal device in the block information is subsequently determined. Therefore, a corresponding operation may be performed, based on the analytics result, on the terminal device corresponding to the block information.

In a possible implementation method, the request message includes path information. The data analytics network element determines the block information based on step information and the path information.

According to the foregoing solution, the block information corresponding to the path information may be determined, so that an analytics result of a terminal device in the block information corresponding to the path information is subsequently determined. Therefore, a corresponding operation may be performed, based on the analytics result, on the terminal device corresponding to the block information.

In a possible implementation method, the request message further includes the step information; or the data analytics network element determines the step information.

In a possible implementation method, the step information includes a step and/or block type information.

In a possible implementation method, the request message includes the block information.

According to the foregoing solution, the core network element or the third-party network element includes the block information in the request message, so that an analytics result of a terminal device in the block information is subsequently determined. Therefore, a corresponding operation may be performed, based on the analytics result, on the terminal device corresponding to the block information. In addition, in this solution, the core network element or the third-party network element determines the block information, and the data analytics network element does not need to determine the block information. This may reduce overheads of the data analytics network element.

In a possible implementation method, the data analytics network element determines first data of a terminal device in the coverage area of the block corresponding to the block information. The data analytics network element determines the analytics result based on the first data.

According to the foregoing solution, the analytics result corresponding to the block information is determined based on the first data of the terminal device in the coverage area of the block corresponding to the block information. This may accurately determine the analytics result corresponding to the block information.

In a possible implementation method, the analytics result includes indication information and/or a weighted mean of the first data of the terminal device in the coverage area of the block corresponding to the block information, and the indication information indicates whether the weighted mean of the first data of the terminal device in the coverage area of the block corresponding to the block information is greater than a preset threshold.

According to the foregoing solution, the indication information and/or the weighted mean of the first data of the terminal device in the coverage area of the block corresponding to the block information are/is provided to the core network element or the third-party network element. This helps the core network element or the third-party network element send a correct instruction to the terminal device in the block information.

In a possible implementation method, the first data includes a throughput of the terminal device; or the first data includes a quantity of abnormally released quality of service flows of the terminal device.

In a possible implementation method, the data analytics network element obtains, from a mobility management network element, first association information of a terminal device in a tracking area or a cell corresponding to the block information. The data analytics network element obtains, from a network management device or an access network device, first data and second association information of the terminal device in the tracking area or the cell corresponding to the block information. The data analytics network element obtains, from the location management network element, third association information of the terminal device in the coverage area of the block corresponding to the block information. The data analytics network element determines, based on the first association information, the second association information, the third association information, and the first data of the terminal device in the tracking area or the cell corresponding to the block information, the first data of the terminal device in the coverage area of the block corresponding to the block information.

In a possible implementation method, the data analytics network element determines, based on first information in the first association information, the first information in the second association information, and the first data of the terminal device in the tracking area or the cell corresponding to the block information, the first data and fourth association information of the terminal device in the tracking area or the cell corresponding to the block information. The data analytics network element determines, based on second information in the fourth association information, the second information in the third association information, and the first data of the terminal device in the tracking area or the cell corresponding to the block information, the first data of the terminal device in the coverage area of the block corresponding to the block information.

In a possible implementation method, the data analytics network element determines, based on third information in the first association information and the third information in the third association information, fourth association information of the terminal device in the coverage area of the block corresponding to the block information. The data analytics network element determines, based on fourth information in the fourth association information, the fourth information in the second association information, and the first data of the terminal device in the tracking area or the cell corresponding to the block information, the first data of the terminal device in the coverage area of the block corresponding to the block information.

In a possible implementation method, the data analytics network element obtains, from a mobility management network element, first association information of a terminal device in a tracking area or a cell corresponding to the block information. The data analytics network element obtains, from a network management device or an access network device, first data and second association information of the terminal device in the tracking area or the cell corresponding to the block information. The data analytics network element obtains, from the location management network element, third association information and location information of the terminal device in the tracking area or the cell corresponding to the block information. The data analytics network element determines, based on the first association information, the first data of the terminal device, the second association information, the third association information, and the location information of the terminal device in the tracking area or the cell corresponding to the block information, the first data of the terminal device in the coverage area of the block corresponding to the block information.

In a possible implementation method, the data analytics network element determines, based on fifth information in the first association information, the fifth information in the second association information, and the first data of the terminal device in the tracking area or the cell corresponding to the block information, fourth association information and the first data of the terminal device in the tracking area or the cell corresponding to the block information. The data analytics network element determines, based on sixth information in the fourth association information, the first data of the terminal device in the tracking area or the cell corresponding to the block information, the sixth information in the third association information, and the location information of the terminal device in the tracking area or the cell corresponding to the block information, the location information and the first data of the terminal device in the tracking area or the cell corresponding to the block information. The data analytics network element determines, based on the block information, and the location information and the first data of the terminal device in the tracking area or the cell corresponding to the block information, the first data of the terminal device in the coverage area of the block corresponding to the block information.

In a possible implementation method, the data analytics network element determines, based on seventh information in the first association information, the seventh information in the third association information, and the location information of the terminal device in the tracking area or the cell corresponding to the block information, fourth association information and the location information of the terminal device in the tracking area or the cell corresponding to the block information. The data analytics network element determines, based on eighth information in the fourth association information, the location information of the terminal device in the tracking area or the cell corresponding to the block information, the eighth information in the second association information, and the first data of the terminal device in the tracking area or the cell corresponding to the block information, the location information and the first data of the terminal device in the tracking area or the cell corresponding to the block information. The data analytics network element determines, based on the block information, and the location information and the first data of the terminal device in the tracking area or the cell corresponding to the block information, the first data of the terminal device in the coverage area of the block corresponding to the block information.

In a possible implementation method, the data analytics network element obtains, from a mobility management network element, first association information and location information of a terminal device in a tracking area or a cell corresponding to the block information. The data analytics network element obtains, from a network management device or an access network device, second association information and first data of the terminal device in the tracking area or the cell corresponding to the block information. The data analytics network element determines, based on the first association information, the location information of the terminal device in the tracking area or the cell corresponding to the block information, the second association information, and the first data of the terminal device in the tracking area or the cell corresponding to the block information, the first data of the terminal device in the coverage area of the block corresponding to the block information.

In a possible implementation method, the data analytics network element determines, based on ninth information in the first association information, the ninth information in the second association information, the location information of the terminal device in the tracking area or the cell corresponding to the block information, and the first data of the terminal device in the tracking area or the cell corresponding to the block information, the location information and the first data of the terminal device in the tracking area or the cell corresponding to the block information. The data analytics network element determines, based on the block information, and the location information and the first data of the terminal device in the tracking area or the cell corresponding to the block information, the first data of the terminal device in the coverage area of the block corresponding to the block information.

In a possible implementation method, the data analytics network element determines identification information of the tracking area corresponding to the block information or identification information of the cell corresponding to the block information; or the data analytics network element obtains, from a network exposure network element, identification information of the tracking area corresponding to the block information or identification information of the cell corresponding to the block information.

In a possible implementation method, the first association information includes identification information of the terminal device, a globally unique identifier of the access network device, identification information allocated by the access network device to the terminal device on an N2 interface, and time information. The second association information includes the globally unique identifier of the access network device, the identification information allocated by the access network device to the terminal device on the N2 interface, and the time information. The third association information includes the identification information of the terminal device and the time information.

In a possible implementation method, the block information includes block identification information and/or the coverage area of the block corresponding to the block information.

According to a second aspect, an embodiment of this application provides a communication method. The method may be performed by a core network element, a third-party network element, a module (for example, a chip) used in the core network element, or a module (for example, a chip) used in the third-party network element. An example in which the core network element or the third-party network element performs the method is used. The method includes: The core network element or the third-party network element sends a request message to a data analytics network element, where the request message is used to request an analytics result. The core network element or the third-party network element receives, from the data analytics network element, block information and an analytics result corresponding to the block information, where a coverage area of a block corresponding to the block information is smaller than a coverage area of a cell.

According to the foregoing solution, the data analytics network element provides the core network element or the third-party network element with an analytics result at a block granularity that is finer than a cell granularity, so that the core network element or the third-party network element can perform a more refined operation based on the analytics result at the block granularity.

In a possible implementation method, the request message includes identification information of a first terminal device, and the request message is specifically used to request an analytics result of the first terminal device.

In a possible implementation method, the request message includes path information, and the request message is specifically used to request an analytics result of a block corresponding to the path information.

In a possible implementation method, the request message further includes step information. The step information includes a step and/or block type information. The step information is used to determine the block information.

In a possible implementation method, the request message includes the block information.

In a possible implementation method, the analytics result includes indication information and/or a weighted mean of first data of a terminal device in the coverage area of the block corresponding to the block information, and the indication information indicates whether the weighted mean of the first data of the terminal device in the coverage area of the block corresponding to the block information is greater than a preset threshold.

In a possible implementation method, the block information includes block identification information and/or the coverage area of the block corresponding to the block information.

According to a third aspect, an embodiment of this application provides a communication method. The method may be performed by a location management network element or a module (for example, a chip) used in the location management network element. An example in which the location management network element performs the method is used. The method includes: The location management network element receives a request message from a data analytics network element, where the request message includes block information and identification information of a tracking area corresponding to the block information or identification information of a cell corresponding to the block information, the request message is used to request association information of a terminal device in a coverage area of a block corresponding to the block information, and the coverage area of the block corresponding to the block information is smaller than a coverage area of the cell. The location management network element obtains location information of a terminal device in the tracking area or the cell corresponding to the block information. The location management network element selects, from the terminal device in the tracking area or the cell based on the block information and the location information of the terminal device in the tracking area or the cell corresponding to the block information, the terminal device in the coverage area of the block corresponding to the block information. The location management network element sends, to the data analytics network element, the association information of the terminal device in the coverage area of the block corresponding to the block information.

In a possible implementation method, the association information includes time information and identification information of the terminal device.

In a possible implementation method, the request message further includes an event identifier. The event identifier identifies a type of a requested event. The type of the event is association information of a terminal device that camps on a block.

In a possible implementation method, the block information includes block identification information and/or the coverage area of the block corresponding to the block information.

According to a fourth aspect, an embodiment of this application provides a communication apparatus. The apparatus may be a data analytics network element or a module (for example, a chip) used in the data analytics network element. The apparatus has a function of implementing any implementation method in the first aspect. The function may be implemented by hardware, or may be implemented by hardware executing corresponding software. The hardware or the software includes one or more modules corresponding to the function.

According to a fifth aspect, an embodiment of this application provides a communication apparatus. The apparatus may be a core network element, a third-party network element, a module (for example, a chip) used in the core network element, or a module (for example, a chip) used in the third-party network element. The apparatus has a function of implementing any implementation method in the second aspect. The function may be implemented by hardware, or may be implemented by hardware executing corresponding software. The hardware or the software includes one or more modules corresponding to the function.

According to a sixth aspect, an embodiment of this application provides a communication apparatus. The apparatus may be a location management network element or a module (for example, a chip) used in the location management network element. The apparatus has a function of implementing any implementation method in the third aspect. The function may be implemented by hardware, or may be implemented by hardware executing corresponding software. The hardware or the software includes one or more modules corresponding to the function.

According to a seventh aspect, an embodiment of this application provides a communication apparatus, including a processor and a memory. The memory is configured to store computer instructions. When the apparatus runs, the processor executes the computer instructions stored in the memory, so that the apparatus performs any implementation method in the first aspect to the third aspect.

According to an eighth aspect, an embodiment of this application provides a communication apparatus, including units or means for performing steps of any implementation method in the first aspect to the third aspect.

According to a ninth aspect, an embodiment of this application provides a communication apparatus, including a processor and an interface circuit. The processor is configured to: communicate with another apparatus by using the interface circuit, and perform any implementation method in the first aspect to the third aspect. There are one or more processors.

According to a tenth aspect, an embodiment of this application provides a communication apparatus, including a processor coupled to a memory. The processor is configured to invoke a program stored in the memory, to perform any implementation method in the first aspect to the third aspect. The memory may be located inside or outside the apparatus. In addition, there may be one or more processors.

According to an eleventh aspect, an embodiment of this application further provides a computer-readable storage medium. The computer-readable storage medium stores instructions. When the instructions are run on a communication apparatus, any implementation method in the first aspect to the third aspect is performed.

According to a twelfth aspect, an embodiment of this application further provides a computer program product. The computer program product includes a computer program or instructions. When the computer program or the instructions are run by a communication apparatus, any implementation method in the first aspect to the third aspect is performed.

According to a thirteenth aspect, an embodiment of this application further provides a chip system, including a processor, configured to perform any implementation method in the first aspect to the third aspect.

According to a fourteenth aspect, an embodiment of this application further provides a communication system, including a data analytics network element configured to perform any implementation method in the first aspect, and a core network element or a third-party network element configured to perform any implementation method in the second aspect.

In a possible implementation method, the communication system further includes a location management network element configured to perform any implementation method in the third aspect.

DESCRIPTION OF EMBODIMENTS

Figure 1:
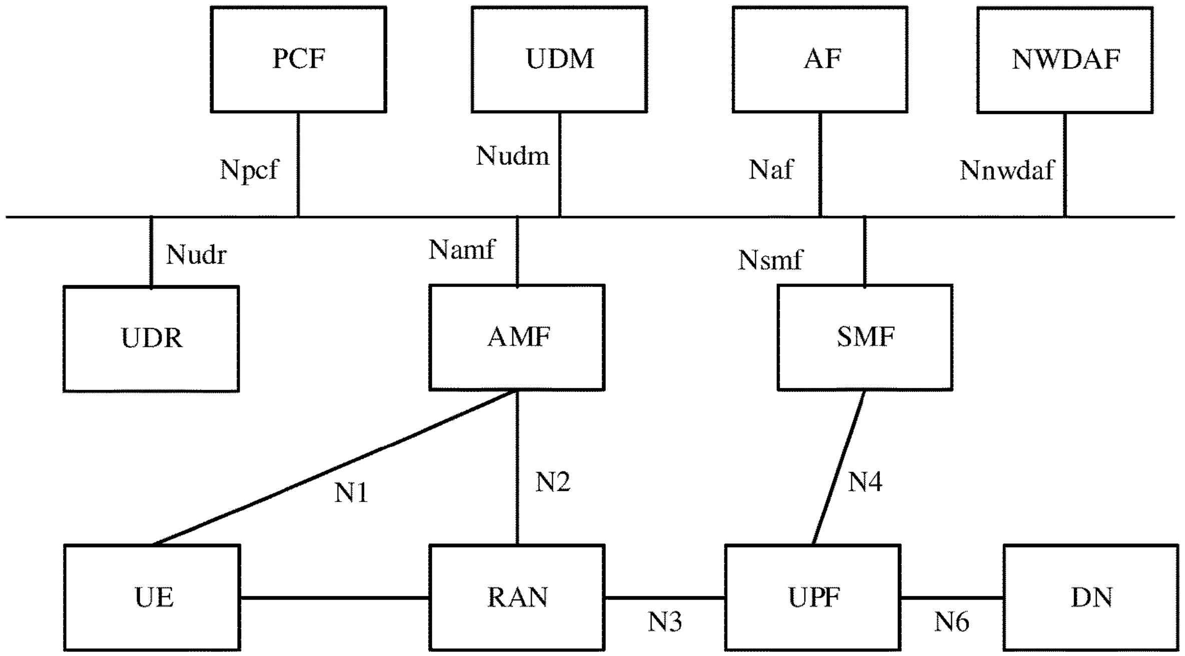
FIG. 1 is a schematic diagram of a 5G network architecture based on a service-oriented architecture.

FIG. 1 is a schematic diagram of a 5G network architecture based on a service-oriented architecture. The 5G network architecture shown in FIG. 1 may include a terminal device, an access network device, and a core network device. The terminal device accesses a data network (DN) through the access network device and the core network device. The core network device includes some or all of the following network elements: a unified data management (UDM) network element, a unified data repository (UDR) network element, a network exposure function (NEF) network element (which is not shown in the figure), an application function (AF) network element, a policy control function (PCF) network element, an access and mobility management function (AMF) network element, a session management function (SMF) network element, a user plane function (UPF) network element, a network data analytics function (NWDAF) network element, a network repository function (NRF) network element (which is not shown in the figure), and a location management function (LMF) network element (which is not shown in the figure).

The access network device may be a radio access network (RAN) device, for example, a base station, an evolved NodeB (eNodeB), a transmission reception point (TRP), a next generation NodeB (gNB) in a 5G mobile communication system, a next generation in a 6th generation (6G) mobile communication system, a base station in a future mobile communication system, or an access node in a wireless fidelity (Wi-Fi) system. Alternatively, the radio access network may be a module or a unit, for example, may be a central unit (CU), or may be a distributed unit (DU), that implements some functions of a base station. The radio access network device may be a macro base station, may be a micro base station or an indoor base station, or may be a relay node, a donor node, or the like. A specific technology and a specific device form that are used by the radio access network device are not limited in embodiments of this application.

The terminal device may be user equipment (UE), a mobile station, a mobile terminal, or the like. The terminal device may be widely used in various scenarios, for example, a device-to-device (D2D) scenario, a vehicle-to-everything (V2X) communication scenario, a machine-type communication (MTC) scenario, an internet of things (IoT) scenario, a virtual reality scenario, an augmented reality scenario, an industrial control scenario, an autonomous driving scenario, a telemedicine scenario, a smart grid scenario, a smart furniture scenario, a smart office scenario, a smart wearable scenario, a smart transportation scenario, and a smart city scenario. The terminal device may be a mobile phone, a tablet computer, a computer with a wireless transceiver function, a wearable device, a vehicle, an urban air means of transport (for example, an uncrewed aerial vehicle and a helicopter), a ship, a robot, a robot arm, a smart home device, or the like.

The access network device and the terminal device may be fixed at a location, or may be movable. The access network device and the terminal device may be deployed on land, including an indoor or outdoor device, or a handheld or vehicle-mounted device; may be deployed on a water surface; or may be deployed on a plane, a balloon, or a man-made satellite in the air. Application scenarios of the access network device and the terminal device are not limited in embodiments of this application.

The AMF network element includes functions, for example, performs mobility management and access authentication/authorization. In addition, the AMF network element is further responsible for transferring a user policy between the terminal device and the PCF.

The SMF network element includes functions, for example, performs session management, performs control policy delivered by the PCF, selects the UPF, and allocates an internet protocol (IP) address of the terminal device.

The UPF network element, serving as an interface between the UPF network element and the data network, includes functions, for example, completes user plane data forwarding, session/flow level-based charging statistics, and bandwidth limiting.

The UDM network element includes functions, for example, performs subscription data management and user access authorization.

The UDR network element includes storage and retrieval functions, for example, performs storage and retrieval of subscription data, policy data, application data, and other types of data.

The NEF network element is configured to support exposure of capabilities and events.

The AF network element transfers a requirement, for example, a QoS requirement or user status event subscription, of an application side for a network side. The AF may be a third-party functional entity, or may be an application server deployed by an operator.

The PCF network element includes policy control functions, for example, is responsible for charging for a session and a service flow level, QoS bandwidth assurance and mobility management, and terminal device policy decision.

The NRF network element may be configured to provide a network element discovery function, and provide, based on a request of another network element, network element information corresponding to a network element type. The NRF network element further provides network element management services, for example, network element registration, update, and deregistration, and network element status subscription and push.

The NWDAF network element is mainly configured to collect data (including one or more of terminal device data, access network device data, core network element data, and third-party application device data), where the data may be data of the terminal device, the access network device, a core network element, or a third-party application device, or may be data of the terminal device on the access network device, the core network element, or the third-party application device, then performs data analytics based on the collected data, and outputs a data analytics result. The data analytics result is used by a network, a network management device, and an application to make policy decisions. The NWDAF may perform data analytics by using a machine learning model. In Release 17 of a 3rd generation partnership project (3GPP), a training function and an inference function of the NWDAF are split. One NWDAF may support only a model training function, only a data inference function, or both the model training function and the data inference function. The NWDAF that supports the model training function may also be referred to as a training NWDAF, or referred to as an NWDAF that supports a model training logical function (MTLF) (NWDAF (MTLF) for short). The training NWDAF may perform model training based on obtained data, to obtain a trained model. The NWDAF that supports the data inference function may also be referred to as an inference NWDAF, or referred to as an NWDAF that supports an analytics logical function (AnLF) (NWDAF (AnLF) for short). The inference NWDAF may input data to the trained model, to obtain an analytics result or inference data. In embodiments of this application, the training NWDAF is an NWDAF that at least supports the model training function. In a possible implementation method, the training NWDAF may also support the data inference function. The inference NWDAF is an NWDAF that at least supports the data inference function. In a possible implementation method, the inference NWDAF may also support the model training function. If the NWDAF supports both the model training function and the data inference function, the NWDAF may be referred to as a training NWDAF, an inference NWDAF, a training and inference NWDAF, or an NWDAF. In embodiments of this application, an NWDAF may be an independent network element, or may be co-deployed with another network element, for example, the NWDAF is deployed in the PCF network element or the AMF network element.

The LMF network element is configured to manage location information of the terminal device. The LMF network element may calculate or verify a location of the terminal device and/or estimate a speed of the terminal device, and provide estimation precision. The LMF network element may receive a location request of the AMF network element for the terminal device through an Nlmf interface. The LMF network element may calculate the location of the terminal at one or more of the following granularity: a longitude, a latitude, a height, a tracking area, a cell, and a global positioning system (GPS).

The DN is a network located outside an operator network. The operator network may access a plurality of DNs. A plurality of services may be deployed on the DN, to provide services, for example, data and/or a voice for the terminal device. For example, the DN is a private network of a smart factory, a sensor installed in a workshop of the smart factory may be a terminal device, a control server of the sensor is deployed in the DN, and the control server may serve the sensor. The sensor may communicate with the control server, to obtain instructions of the control server, transfer collected sensor data to the control server according to the instructions, and the like. For another example, the DN is an internal office network of a company, a mobile phone or a computer of an employee of the company may be the terminal device, and the mobile phone or the computer of the employee may access information, data resources, and the like in the internal office network of the company.

In FIG. 1, Nudr, Npcf, Namf, Nudm, Nsmf, Naf and the Nnwdaf are service-oriented interfaces provided by the UDR, the PCF, the AMF, the UDM, the SMF, the AF and the NWDAF, respectively, and invoke corresponding service-oriented operations. N1, N2, N3, N4, and N6 are interface sequence numbers. Meanings of these interface sequence numbers are as follows.

(1) N1 represents an interface between the AMF network element and the terminal device, and may be configured to: transfer non-access stratum (NAS) signaling (for example, including a QoS rule from the AMF network element) to the terminal device, and the like.

(2) N2 represents an interface between the AMF network element and the access network device, and may be configured to: transfer radio bearer control information from a core network side to the access network device, and the like.

(3) N3 represents an interface between the access network device and the UPF network element, and may mainly be configured to transfer uplink and downlink user plane data between the access network device and the UPF network element.

(4) N4 represents an interface between the SMF network element and the UPF network element, and may be configured to transfer information between a control plane and a user plane, including delivery of a forwarding rule, a QoS rule, a traffic statistics rule, and the like from the control plane to the user plane, and reporting of user plane information.

(5) N6 represents an interface between the UPF network element and a DN, and is configured to transfer uplink and downlink user data flows between the UPF network element F and the DN.

Figure 2:
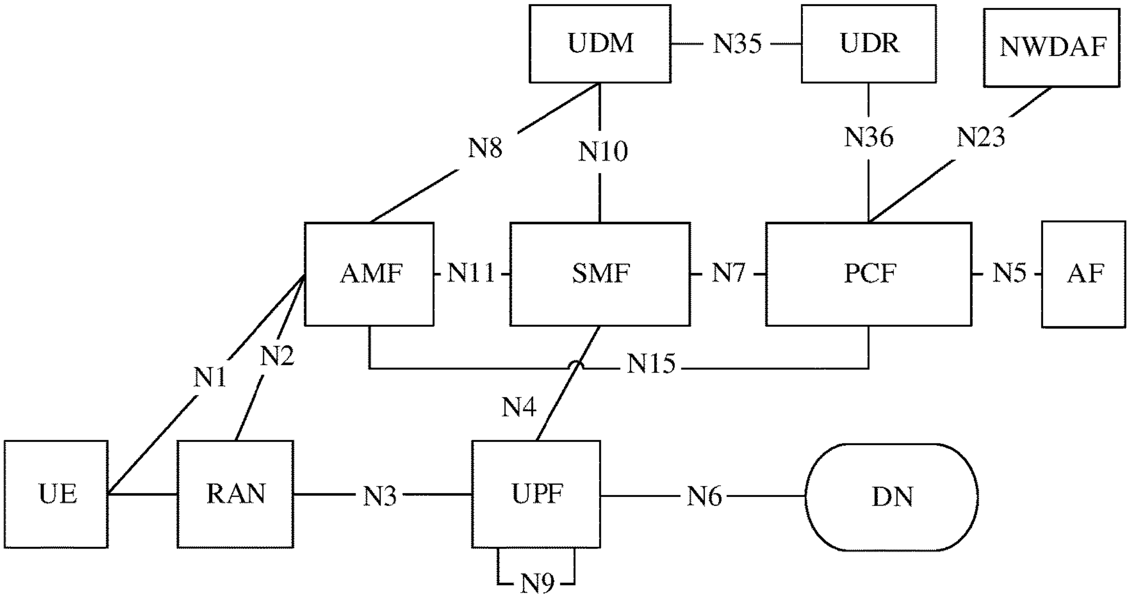
FIG. 2 is a schematic diagram of a 5G network architecture based on a point-to-point interface.

FIG. 2 is a schematic diagram of a 5G network architecture based on a point-to-point interface. For descriptions of functions of network elements, refer to the descriptions of functions of corresponding network elements in FIG. 1. Details are not described again. A main difference between FIG. 2 and FIG. 1 lies in that interfaces between control plane network elements in FIG. 1 are service-oriented interfaces, and interfaces between control plane network elements in FIG. 2 are point-to-point interfaces.

In the architecture shown in FIG. 2, names and functions of interfaces between network elements of a core network are as follows.

(1) N5 represents an interface between an AF network element and a PCF network element, and may be configured to: deliver an application service request and report a network event.

(2) N7 represents an interface between the PCF network element and an SMF network element, and may be configured to deliver a protocol data unit (PDU) session granularity control policy and a service data flow granularity control policy.

(3) N8 represents an interface between an AMF network element and a UDM network element, and may be used by the AMF network element to obtain, from the UDM network element, subscription data and authentication data related to access and mobility management, used by the AMF network element to register current information related to terminal device mobility management with the UDM network element, and the like.

(4) N9 represents a user plane interface between a UPF network element and a UPF network element, and is configured to transfer uplink and downlink user data flows between the UPF network elements.

(5) N10 represents an interface between the SMF network element and the UDM network element, and may be used by the SMF network element to obtain, from the UDM network element, subscription data related to session management, used by the SMF network element to register current information related to a terminal device session with the UDM network element, and the like.

(6) N11 represents an interface between the SMF network element and the AMF network element, and may be configured to: transfer PDU session tunnel information between an access network device and the UPF, transfer a control message sent to a terminal device, transfer radio resource control information sent to the access network device, and the like.

(7) N15 represents an interface between the PCF network element and the AMF network element, and may be configured to deliver a terminal device policy and an access control-related policy.

(8) N23 represents an interface between the PCF network element and an NWDAF network element, and the NWDAF network element may collect data on the PCF network element through the interface. It should be noted that there may be an interface between the NWDAF network element and another device (for example, the AMF network element, the UPF network element, the access network device, or the terminal device). This is not completely shown in the figure.

(9) N35 represents an interface between the UDM network element and a UDR network element, and is used by the UDM network element to obtain, from the UDR network element, user subscription data information.

(10) N36 represents an interface between the PCF network element and the UDR network element, and is used by the PCF network element to obtain, from the UDR network element, policy-related subscription data and application data-related information.

It may be understood that the foregoing network elements or functions may be network elements in a hardware device, may be software functions running on dedicated hardware, or may be virtualized functions instantiated on a platform (for example, a cloud platform). In a possible implementation method, the foregoing network elements or functions may be implemented by one device, may be jointly implemented by a plurality of devices, or may be one functional module in one device. This is not specifically limited in embodiments of this application.

In an implementation method, a data analytics network element in embodiments of this application may be the foregoing NWDAF network element, or may be a network element that has functions of the foregoing NWDAF network element in a future communication network such as a 6G network. For ease of description, the following uses an example in which the data analytics network element is the NWDAF network element for description, and the NWDAF network element is referred to as an NWDAF for short.

In an implementation method, a location management network element in embodiments of this application may be the foregoing LMF network element, or may be a network element that has functions of the foregoing LMF network element in a future communication network such as a 6G network. For ease of description, the following uses an example in which the location management network element is the LMF network element for description, and the LMF network element is referred to as an LMF for short.

To facilitate understanding of the solutions in embodiments of this application, the following first describes technologies related to embodiments of this application.

1. An NWDAF Implements Service Data Analytics Through Pairwise Association

Typically, to perform data analytics at an end-to-end terminal device granularity among an access network device, a core network device, and an AF network element (which may be an AF network element in a core network or a third-party AF network element), the NWDAF needs to associate data of a terminal device on the access network device, the core network device (also referred to as a core network element), and the third-party AF network element. The NWDAF may determine the data of the terminal device through pairwise association based on association information.

For example, the following idea is used: access network device-AMF network element-SMF network element-UPF network element-AF network element.

When reporting data, both the access network device and the AMF network element include a timestamp, identification information (a RAN UE NGAP ID) allocated by the access network device to the terminal device on an N2 interface, and a globally unique identifier (Global RAN Node ID) of the access network device. In other words, each piece of data is identified by using association information, and the association information includes the timestamp, the RAN UE NGAP ID, and the global RAN node ID. NGAP is short for a next generation application protocol. Therefore, the NWDAF associates data of the terminal device on the access network device and the AMF based on the timestamp, the RAN UE NGAP ID, and the global RAN node ID. In embodiments of this application, the timestamp is also referred to as time information, where the timestamp and the time information convey a same meaning.

In embodiments of this application, the globally unique identifier of the access network device may alternatively be replaced with an identifier of a mobility management network element. The identifier of the mobility management network element may be, for example, a globally unique AMF ID (globally unique AMF identifier, GUAMI).

In embodiments of this application, the identification information allocated by the access network device to the terminal device on the N2 interface may alternatively be replaced with identification information allocated by the mobility management network element to the terminal device on the N2 interface. The identification information allocated by the mobility management network element to the terminal device on the N2 interface may be, for example, an AMF UE NGAP ID.

Similarly, the NWDAF may associate data of the terminal device on the access network device and the UPF network element based on the timestamp and access network tunnel information (AN Tunnel Info), associate data of the terminal device on the SMF network element and a PCF network element based on the timestamp and a subscription permanent identifier (SUPI), associate data of the terminal device on the AMF network element and the SMF network element based on the timestamp and the SUPI, associate data of the terminal device on the SMF network element and the UPF network element based on the timestamp and identification information (UE IP) of the terminal device, and associate data of the terminal device on the AF network element and the UPF network element based on the timestamp and an internet protocol 5-tuple (IP 5-tuple).

2. Minimization of Drive Tests (MDT) Data

The MDT data is measurement report data measured by the terminal device and reported to a network management device through the access network device, and/or measurement report data measured by the access network device and reported to the network management device. The measurement report data measured by the access network device is data at a terminal device granularity. The network management device may find disadvantages such as weak coverage, a coverage hole, and overshoot coverage based on the measurement report data. Because the terminal device and/or the access network device can actively measure and report data, and real drive tests do not need to be performed, costs can be reduced.

The MDT data at the terminal device granularity includes the following measurement (measurement) values.

(1) Uplink or downlink IP throughput measured by the access network device: The IP throughput is measured per terminal device per physical resource block (PRB) (per UE per PRB). When reporting the IP throughput, the terminal device may further report a 5QI value corresponding to the PRB. In embodiments of this application, the IP throughput may also be referred to as a throughput for short.

(2) Quantity, measured by the access network device, of abnormally released QoS flows of the terminal device.

Vehicle-to-everything (V2X) is an important application scenario of a 5G network. A V2X application server (also referred to as a V2X AF) responsible for vehicle autonomous driving control may control driving of a vehicle via the 5G network, or collect vehicle status information from the vehicle via the 5G network. Vehicle autonomous driving is highly related to safety. If the V2X AF cannot quickly and highly reliably send vehicle control signaling to the vehicle, vehicle damage and death may be caused. Therefore, vehicle autonomous driving has an extremely high requirement for the 5G network. For example, the following Table 1 provides a performance requirement of autonomous driving for the 5G network.

TABLE 1

| Scenario description | Maximum end-to-end delay | Reliability | Data rate |
|---|---|---|---|
| Information exchange between the V2X AF and a V2X application on the vehicle | 5 milliseconds (ms) | 99.999% | Uplink: 25 megabits per second (Mbps) Downlink: 1 Mbps |

Table 1 is merely an example. During actual application, the performance requirement of autonomous driving for the 5G network may be determined depending on an actual situation.

Because vehicle autonomous driving has an extremely high requirement for the 5G network, a network performance monitoring mechanism is needed on the network side, to feed back a network performance monitoring result to the V2X AF. The V2X AF may dynamically adjust application layer parameters depending on the network performance monitoring result, for example, inter vehicle distances, coding schemes, coding parameters, or autonomous driving levels.

To implement network performance monitoring on vehicle autonomous driving by the network side, in embodiments of this application, the NWDAF may collect cell-level data from the network management device (namely, an operation, administration and management (OAM) device). The cell-level data reflects a status of the vehicle during driving. The NWDAF analyzes the cell-level data to obtain a cell-level data analytics result, and then sends the cell-level data analytics result to the V2X AF. The V2X AF determines the application layer parameter of autonomous driving based on the cell-level data analytics result, for example, parameters such as coding parameters and the autonomous driving levels.

For example, the cell-level data analytics result is a quality of service sustainability (QoS Sustainability) analytics result. The following Table 2 provides input data required when the NWDAF determines the quality of service sustainability analytics result. The following Table 3 provides the quality of service sustainability analytics result determined by the NWDAF.

TABLE 2

| Data type | Data source | Description |
|---|---|---|
| IP throughput of a terminal device in a cell (RAN UE IP Throughput) | Network management device | Represents an average bit rate of the terminal device in the cell. For example, a radio link control (RLC)-level payload data amount on an air interface in one time unit of the cell may represent the average bit rate of the terminal device in the cell. During specific implementation, for one cell, an average bit rate that is of the terminal device and that corresponds to a period of time, a 5G QoS identifier (5QI), or a network slice may be calculated. |
| Quality of service flow retainability (QoS flow Retainability) | Network management device | Represents a quantity of abnormally released QoS flows of the terminal device in the cell. During specific implementation, for one cell, a quantity that is of abnormally released QoS flows of the terminal device and that corresponds to a period of time, a 5QI, or a network slice may be calculated. |

TABLE 3

| Quality of service sustainability analytics result | Description |
|---|---|
| Applicable area | An area to which the quality of service sustainability analytics result is applicable may be represented by a tracking area identity (TAI) list or a cell identifier (Cell ID) list. |
| Applicable period of time | Period of time to which the quality of service sustainability analytics result is applicable |
| Indication information | Indicates that the RAN UE IP throughput is greater than a preset first reporting threshold, where the RAN UE IP throughput may be a current statistical value, or may be a predicted value; or indicates that the quantity of abnormally released QoS flows of the terminal device is greater than a preset second reporting threshold, where the quantity of abnormally released QoS flows of the terminal device may a be a current statistical value, or may be predicted value. |

Figure 3:
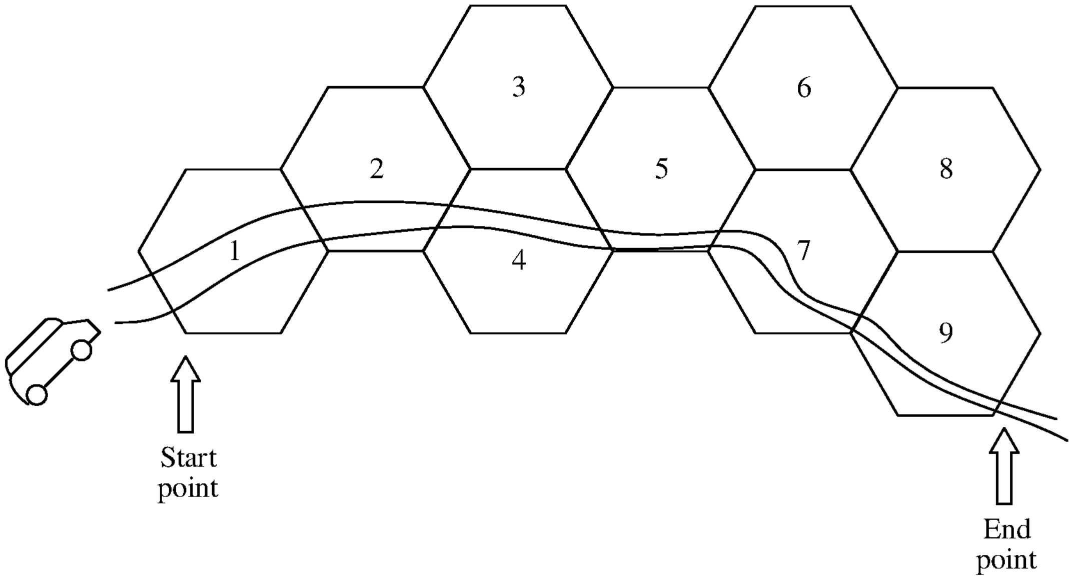
FIG. 3 is a schematic diagram of a driving route of a vehicle.

FIG. 3 is a schematic diagram of a driving route of a vehicle. The vehicle sequentially passes through a cell 1, a cell 2, a cell 4, a cell 5, a cell 7, and a cell 9. An NWDAF separately calculates RAN UE IP throughputs and/or quantities of abnormally released QoS flows of terminal devices in these cells. In addition, the NWDAF sends, to a V2X AF when the RAN UE IP throughput is greater than a first reporting threshold, indication information indicating that the RAN UE IP throughput is greater than the first reporting threshold, and/or sends, to the V2X AF when the quantity of abnormally released QoS flows of the terminal device is greater than a second reporting threshold, indication information indicating that the quantity of abnormally released QoS flows of the terminal device is greater than the second reporting threshold.

In the foregoing solution, the NWDAF may provide the V2X AF with a quality of service sustainability analytics result at a cell granularity. The V2X AF may set an application layer parameter of the vehicle at an entire cell granularity based on the quality of service sustainability analytics result at the cell granularity.

This solution has the following disadvantage: The quality of service sustainability analytics result at the cell granularity is excessively coarse in granularity, which is not of much significance for setting the application layer parameter of the vehicle. This is because a cell covers several hundreds of meters to several kilometers, or even dozens of kilometers, and the quality of service sustainability analytics result at the cell granularity is an average result of the entire cell. This does not mean that a RAN UE IP throughput at each location in the cell is greater than the first reporting threshold, or is less than the first reporting threshold. For example, a signal at a location of a cell center is good, and therefore, a RAN UE IP throughput at the cell center is greater than the first reporting threshold. However, a signal at a cell edge is poor, and therefore a RAN UE IP throughput at the cell edge may be less than the first reporting threshold. Similarly, this does not mean that a quantity of abnormally released QoS flows of the terminal device at each location in the cell is greater than the second reporting threshold, or is less than the second reporting threshold. For example, a signal at a location of a cell center is good, and therefore, a quantity of abnormally released QoS flows of the terminal device at the cell center is less than the second reporting threshold. However, a signal at a cell edge is poor, and therefore a quantity of abnormally released QoS flows of the terminal device at the cell edge is greater than the second reporting threshold.

Therefore, quality of service sustainability data analytics in an area with a finer granularity than the cell is required on a network side, to implement separate analytics in different areas in the cell, so that the V2X AF can more accurately set the application layer parameters of the vehicle.

Embodiments of this application provide area planning at a block granularity. A block may be a rectangular range, a circular range, a square range, or a range of another shape. The block shape is not limited in this application. The block granularity is finer than a cell granularity, to be specific, a coverage area of a block does not exceed a coverage area of a cell. A block may cross one or more cells, or cross one or more tracking areas (TAs), where one tracking area includes one or more cells.

For example, a block is a rectangular area. In this case, the block may be determined based on a location of a terminal device, a rectangle length, a rectangle width, and a rectangle direction. For example, the location of the terminal device is a rectangle center, and then a rectangular area may be determined with reference to the rectangle length, the rectangle width, and the rectangle direction. The rectangular area is a block.

For example, a block is a circular area. In this case, the block may be determined based on a location of a terminal device and a step. For example, a circular area may be determined by using the location of the terminal device as a circle center and with reference to the step. The circular area is a block.

It should be noted that in embodiments of this application, the descriptions about "block" may all be replaced with descriptions of another area type, for example, an "island" or a "cluster", which is a granularity finer than the cell granularity. In other words, embodiments of this application do not limit the concept of "block", and only the area type with a granularity that is finer than the cell granularity is limited. Therefore, any solution in which data is collected and analyzed at a granularity that is finer than the cell granularity falls within the protection scope of embodiments of this application.

Figure 4:
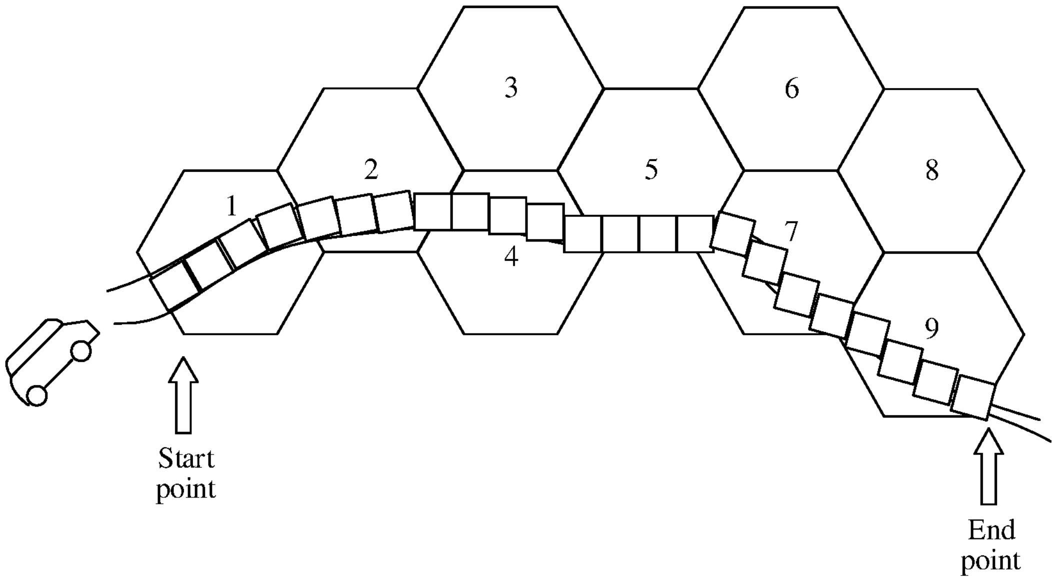
FIG. 4 is another schematic diagram of a driving route of a vehicle.

FIG. 4 is another schematic diagram of a driving route of a vehicle. In the schematic diagram, an example in which a block is a rectangular area is used. During driving, the vehicle sequentially passes through various blocks along a driving direction. Each block crosses one or more cells or one or more tracking areas, and a coverage area of each block is smaller than a coverage area of one cell.

Figure 5:
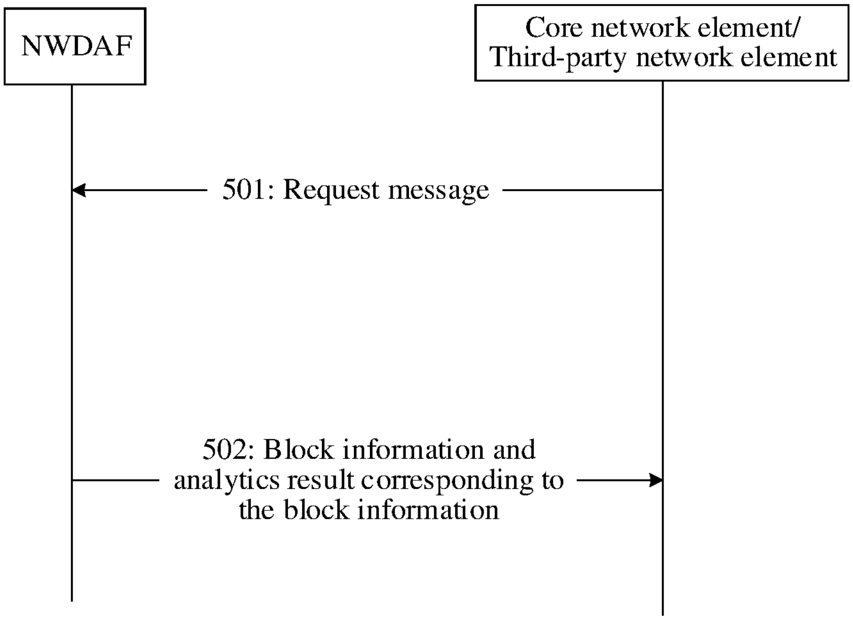
FIG. 5 is a schematic flowchart of a communication method according to an embodiment of this application.

FIG. 5 is a schematic flowchart of a communication method according to an embodiment of this application. The method includes the following steps.

Step 501: A core network element or a third-party network element sends a request message to an NWDAF. Correspondingly, the NWDAF receives the request message.

The core network element herein includes but is not limited to an AMF network element, an SMF network element, a PCF network element, a UPF network element, or an AF network element in a core network. The third-party network element herein is a third-party application server, and is also referred to as a third-party AF network element. For example, the third-party network element may be a V2X AF of an enterprise.

The request message is used to request an analytics result.

In an implementation method, the request message includes identification information (Analytics ID) of an analytics type, and the request message is used to request an analytics result corresponding to the analytics type. In an implementation method, if the identification information of the analytics type is QoS sustainability, the request message is used to request an analytics result corresponding to the QoS sustainability.

Step 502: The NWDAF sends, to the core network element or the third-party network element, block information and an analytics result corresponding to the block information. Correspondingly, the core network element or the third-party network element receives the block information and the analytics result corresponding to the block information.

In an implementation method, each piece of block information includes block identification information and/or a coverage area of a block corresponding to the block information. The coverage area of the block corresponding to each piece of block information is less than a coverage area of a cell. The cell herein is a cell in which a terminal device is currently located, a cell at a specified location, or a cell corresponding to the block information. FIG. 4 is used as an example. A coverage area of a block corresponding to a piece of block information is smaller than the coverage area of the cell. The coverage area of the block corresponding to the block information may be represented by using longitude and latitude ranges, or may be represented by using the longitude and latitude ranges and an altitude range. For example, when the block is a rectangular area, the coverage area of the block corresponding to the block information is indicated by using the following information: rectangle, longitude and latitude of center point=(41° 24'N, 2°10'E), length=1 km, width=1.5 km, and direction. "rectangle" represents a rectangle type, "length" and "width" indicate the coverage area, "direction" may be a vector direction of a vertical line from the center point of the rectangle to a long side of the rectangle in a reference coordinate system, and "longitude and latitude of center point" are longitude and latitude coordinates of a location of a block center.

For a block corresponding to each piece of block information, the block may be completely located in one tracking area or one cell. In this case, the block corresponds to one tracking area or one cell. Alternatively, the block may be located at an edge of a tracking area or a cell. In this case, the block may be corresponding to a plurality of tracking areas or a plurality of cells, for example, corresponding to two tracking areas or three tracking areas, or corresponding to two cells or three cells.

In an implementation method, in step 502, the NWDAF sends, to the core network element or the third-party network element, one piece of block information and an analytics result corresponding to the block information. In another implementation method, in step 502, the NWDAF sends, to the core network element or the third-party network element, a plurality of pieces of block information and an analytics result corresponding to each of the plurality of pieces of block information.

According to the foregoing solution, the NWDAF provides the core network element or the third-party network element with an analytics result at a block granularity that is finer than a cell granularity, so that the core network element or the third-party network element can perform a more refined operation based on the analytics result at the block granularity.

In an implementation method, before step 502, the NWDAF further needs to determine to obtain an analytics result or analytics results corresponding to which block or which blocks. Therefore, the NWDAF needs to first determine block information. For example, the following describes three different implementation methods for obtaining the block information by the NWDAF.

In an implementation method, if the request message in step 501 includes identification information of one terminal device, for example, includes identification information of a first terminal device, the request message is specifically used to request an analytics result of the first terminal device, to be specific, request an analytics result corresponding to a block in which the first terminal device is located. The NWDAF may obtain the identification information of the first terminal device from the request message, and then obtain location information of the first terminal device from an LMF. Then, the NWDAF determines, based on step information and the location information of the first terminal device, block information corresponding to the block in which the first terminal device is located. The first terminal device is located in a coverage area of a block corresponding to the block information. For example, the NWDAF uses a location indicated by the location information of the first terminal device as a block center, and determines a block range with reference to the step information, to obtain the block information. The step information includes a step and/or block type information. The step may be used to determine a coverage size of the block, and the block type information indicates a block shape, for example, a circle, a square, or a rectangle. The step information may be carried in the request message in step 501. If the request message does not carry the step information, the NWDAF may determine the step information based on information such as a moving speed and a moving direction of the first terminal device. For example, if the step information in the request message or the step information determined by the NWDAF indicates a circular area whose radius is R, the coverage area of the block corresponding to the block information determined by the NWDAF may be a circular area whose circle center is a current location of the first terminal device and whose radius is R, may be a circular area whose circle center is a predicted location of the first terminal device at a next moment or a future moment and whose radius is R, or certainly may be a circular area of another type.

In another implementation method, the request message in step 501 includes path information. The path information indicates a historical movement path of the terminal device, and/or indicates a future movement path of the terminal device. The path information may be represented by a group of longitude and latitude information. For example, the path information is represented as ((41° 24'N, 2° 10'E), (41°23'N, 2°10'E), (41°23'N, 2° 11'E), (41°25'N, 2° 11'E), . . . ), where "N" represents the north latitude, and "E" represents the east longitude. The NWDAF may determine one or more pieces of block information based on step information and the path information. Specifically, the NWDAF divides, based on the step information, a path indicated by the path information into a plurality of segments. Each segment corresponds to one piece of block information. For example, when the path indicated by the path information is a group of longitude and latitude information, for example, ((x1, y1), (x2, y2), . . . , and (x10, y10)), a continuous path may be obtained through fitting based on the group of longitude and latitude information. Then, the path is divided into one or more blocks based on the step information, for example, may be divided into three blocks. Path segments corresponding to a block 1 include ((x1, y1), (x2, y2), and (x3, y3)), path segments corresponding to a block 2 include ((x4, y4), (x5, y5), and (x6, y6)), and path segments corresponding to a block 3 include ((x7, y7), (x8, y8), (x9, y9), and (x10, y10)). The step information includes a step and/or block type information. The step may be used to determine a coverage size of the block, and the block type information indicates a block shape, for example, a circle, a square, or a rectangle. The step information may be carried in the request message in step 501. If the request message does not carry the step information, the NWDAF may determine the step information based on information such as a moving speed and a moving direction of the terminal device. For example, if the step information in the request message or the step information determined by the NWDAF indicates a circular area whose radius is R, the coverage area of the block corresponding to the block information determined by the NWDAF is a circular area whose radius is R.

In another implementation method, the request message in step 501 includes one or more pieces of block information. The one or more pieces of block information are determined by the core network element or the third-party network element, and the NWDAF may obtain the one or more pieces of block information from the request message. For example, the core network element or the third-party network element may determine block information of a block in which the terminal device is currently located, and include the block information in the request message. Alternatively, the core network element or the third-party network element may determine a plurality of pieces of block information corresponding to the terminal device, and include the plurality of pieces of block information in the request message. The plurality of pieces of block information may include one or more of the block information of the block in which the terminal device is currently located, block information of a block that the terminal device has passed through, or block information of a block that the terminal device may pass through in the future. For example, the core network element or the third-party network element provides (block information 1, block information 2, block information 3, . . . ).

After receiving the request message from the core network element or the third-party network element, the NWDAF obtains one or more pieces of block information according to any one of the foregoing three methods, then determines first data of a terminal device in the coverage area of the block corresponding to each piece of block information, determines an analytics result based on the first data, and sends the analytics result to the core network element or the third-party network element.

The analytics result herein is an analytics result at the block granularity. In an implementation method, the analytics result includes a weighted mean of the first data of the terminal device in the coverage area of the block corresponding to each piece of block information. To be specific, first data of a same type of all terminal devices in a coverage area of a block corresponding to one piece of block information is obtained, and then weighted averaging is performed on the first data, to obtain a weighted mean, where the weighted mean may be used as an analytics result corresponding to the block information. In another implementation method, after the weighted mean is obtained, indication information may be further determined based on the weighted mean. The indication information indicates whether the weighted value is greater than a preset threshold, and the indication information may be used as an analytics result corresponding to the block information. In other words, an analytics result corresponding to one piece of block information includes the indication information and/or the weighted mean. The preset threshold may be carried in the request message in step 501, or may be preconfigured on the NWDAF. In an implementation method, weights used when weighted averaging is performed on a plurality of pieces of first data are the same. For example, first data of a terminal device in a coverage area of a block corresponding to one piece of block information includes data 1, data 2, data 3, . . . , and data N, where N is an integer greater than 1. When weights corresponding to the N pieces of data are the same, a mean of the N pieces of data may be obtained through calculation, and is equal to (data 1+data 2+ . . . , +data N)/N.

The first data herein may be minimization of drive tests (MDT) data. For example, the data specifically includes a throughput of the terminal device and/or a quantity of abnormally released quality of service flows of the terminal device. The throughput of the terminal device is also referred to as an IP throughput of the terminal device or a RAN UE IP throughput. For explanations of a meaning of the minimization of drive tests data, refer to the foregoing descriptions.

The following describes three different implementation methods in which an NWDAF determines or obtains first data of a terminal device in a coverage area of a block corresponding to each of the one or more pieces of block information.

In the following three implementation methods, first association information includes identification information of the terminal device, a globally unique identifier of an access network device, identification information allocated by the access network device to the terminal device on an N2 interface, and time information. Second association information includes the globally unique identifier of the access network device, the identification information allocated by the access network device to the terminal device on the N2 interface, and the time information. Third association information includes the identification information of the terminal device and the time information.

Implementation method 1: The NWDAF determines identification information of a tracking area corresponding to each of the one or more pieces of block information or identification information of a cell corresponding to the block information. Alternatively, the NWDAF obtains, from an NEF network element, identification information of a tracking area corresponding to each of the one or more pieces of block information or identification information of a cell corresponding to the block information. Then, the NWDAF obtains, from an AMF network element, first association information of a terminal device in the tracking area or the cell corresponding to each of the one or more pieces of block information. The NWDAF obtains, from a network management device or the access network device, first data and second association information of the terminal device in the tracking area or the cell corresponding to each of the one or more pieces of block information. The NWDAF obtains, from the LMF, third association information of the terminal device in the coverage area of the block corresponding to each of the one or more pieces of block information. Then, the NWDAF determines, based on the first association information, the second association information, the third association information, and the first data of the terminal device in the tracking area or the cell corresponding to each of the one or more pieces of block information, the first data of the terminal device in the coverage area of the block corresponding to each of the one or more pieces of block information.

That the NWDAF obtains, from an AMF network element, first association information of a terminal device in the tracking area or the cell corresponding to each of the one or more pieces of block information specifically includes: The NWDAF sends, to the AMF network element, the identification information of the tracking area corresponding to each of the one or more pieces of block information or the identification information of the cell corresponding to the block information. Then, the AMF network element obtains the first association information of the terminal device in the tracking area or the cell and sends the obtained first association information of the terminal device in the tracking area or the cell to the NWDAF.

That the NWDAF obtains, from a network management device or the access network device, first data and second association information of the terminal device in the tracking area or the cell corresponding to each of the one or more pieces of block information specifically includes: The NWDAF sends, to the network management device or the access network device, the identification information of the tracking area corresponding to each of the one or more pieces of block information or the identification information of the cell corresponding to the block information. Then, the network management device or the access network device obtains the first data and the second association information of the terminal device in the tracking area or the cell and sends the obtained first data and the obtained second association information of the terminal device in the tracking area or the cell to the NWDAF.

That the NWDAF obtains, from the LMF, third association information of the terminal device in the coverage area of the block corresponding to each of the one or more pieces of block information specifically includes: The NWDAF sends a request message to the LMF, where the request message includes the one or more pieces of block information and the identification information of the tracking area corresponding to each of the one or more pieces of block information or the identification information of the cell corresponding to the block information, and the request message is used to request association information of the terminal device in the coverage area of the block corresponding to each of the one or more pieces of block information. Then, the LMF obtains location information of the terminal device in the tracking area or the cell corresponding to each of the one or more pieces of block information. Then, the LMF selects, from the terminal device in the tracking area or the cell based on the one or more pieces of block information and the location information of the terminal device in the tracking area or the cell corresponding to each of the one or more pieces of block information, the terminal device in the coverage area of the block corresponding to each of the one or more pieces of block information. Finally, the LMF sends, to the NWDAF, the third association information of the terminal device in the coverage area of the block corresponding to each of the one or more pieces of block information.

In an implementation method, that the NWDAF determines, based on the first association information, the second association information, the third association information, and the first data of the terminal device in the tracking area or the cell corresponding to each of the one or more pieces of block information, the first data of the terminal device in the coverage area of the block corresponding to each of the one or more pieces of block information specifically includes: The NWDAF first determines, based on first information in the first association information, the first information in the second association information, and the first data of the terminal device in the tracking area or the cell corresponding to each of the one or more pieces of block information, the first data and fourth association information of the terminal device in the tracking area or the cell corresponding to each of the one or more pieces of block information. Then, the NWDAF determines, based on second information in the fourth association information, the second information in the third association information, and the first data of the terminal device in the tracking area or the cell corresponding to the block information, the first data of the terminal device in the coverage area of the block corresponding to the block information. The first information herein refers to an intersection set of the first association information and the second association information. To be specific, the first information includes the globally unique identifier of the access network device, the identification information allocated by the access network device to the terminal device on the N2 interface, and the time information. The fourth association information herein refers to a union set of the first association information and the second association information. To be specific, the fourth association information includes the identification information of the terminal device, the globally unique identifier of the access network device, the identification information allocated by the access network device to the terminal device on the N2 interface, and the time information. The second information herein refers to an intersection set of the fourth association information and the third association information. To be specific, the second information includes the identification information of the terminal device and the time information.

In another implementation method, that the NWDAF determines, based on the first association information, the second association information, the third association information, and the first data of the terminal device in the tracking area or the cell corresponding to each of the one or more pieces of block information, the first data of the terminal device in the coverage area of the block corresponding to each of the one or more pieces of block information specifically includes: The NWDAF first determines, based on third information in the first association information and the third information in the third association information, fourth association information of the terminal device in the coverage area of the block corresponding to each of the one or more pieces of block information. Then, the NWDAF determines, based on fourth information in the fourth association information, the fourth information in the second association information, and the first data of the terminal device in the tracking area or the cell corresponding to each of the one or more pieces of block information, the first data of the terminal device in the coverage area of the block corresponding to each of the one or more pieces of block information. The third information herein refers to an intersection set of the first association information and the third association information. To be specific, the third information includes the identification information of the terminal device and the time information. The fourth association information herein refers to a union set of the first association information and the third association information. To be specific, the fourth association information includes the identification information of the terminal device, the globally unique identifier of the access network device, the identification information allocated by the access network device to the terminal device on the N2 interface, and the time information. The fourth information herein refers to an intersection set of the fourth association information and the second association information. To be specific, the fourth information includes the globally unique identifier of the access network device, the identification information allocated by the access network device to the terminal device on the N2 interface, and the time information.

Specific descriptions about the implementation method 1 are described in detail in the following embodiment corresponding to FIG. 6.

Implementation method 2: The NWDAF determines identification information of a tracking area corresponding to each of the one or more pieces of block information or identification information of a cell corresponding to the block information. Alternatively, the NWDAF obtains, from an NEF network element, identification information of a tracking area corresponding to each of the one or more pieces of block information or identification information of a cell corresponding to the block information. Then, the NWDAF obtains, from an AMF network element, first association information of a terminal device in the tracking area or the cell corresponding to each of the one or more pieces of block information. The NWDAF obtains, from a network management device or the access network device, first data and second association information of the terminal device in the tracking area or the cell corresponding to each of the one or more pieces of block information. The NWDAF obtains, from the LMF, third association information and location information of the terminal device in the tracking area or the cell corresponding to each of the one or more pieces of block information. Then, the NWDAF determines, based on the first association information, the first data of the terminal device, the second association information, the third association information, and the location information of the terminal device in the tracking area or the cell corresponding to each of the one or more pieces of block information, the first data of the terminal device in the coverage area of the block corresponding to each of the one or more pieces of block information.

For a specific implementation method in which the NWDAF obtains, from the AMF network element, the first association information of the terminal device in the tracking area or the cell corresponding to each of the one or more pieces of block information, refer to the descriptions in the implementation method 1.

For a specific implementation method in which the NWDAF obtains, from the network management device or the access network device, the first data and the second association information of the terminal device in the tracking area or the cell corresponding to each of the one or more pieces of block information, refer to the descriptions in the implementation method 1.

That the NWDAF obtains, from the LMF, third association information and location information of the terminal device in the tracking area or the cell corresponding to each of the one or more pieces of block information specifically includes: The NWDAF sends a request message to the LMF, where the request message includes the identification information of the tracking area corresponding to each of the one or more pieces of block information or the identification information of the cell corresponding to the block information. Then, the LMF obtains the location information and the third association information of the terminal device in the tracking area or the cell corresponding to each of the one or more pieces of block information. Then, the LMF sends, to the NWDAF, the third association information and the location information of the terminal device in the tracking area or the cell corresponding to each of the one or more pieces of block information.

In an implementation method, that the NWDAF determines, based on the first association information, the first data of the terminal device, the second association information, the third association information, and the location information of the terminal device in the tracking area or the cell corresponding to each of the one or more pieces of block information, the first data of the terminal device in the coverage area of the block corresponding to each of the one or more pieces of block information specifically includes: The NWDAF first determines, based on fifth information in the first association information, the fifth information in the second association information, and the first data of the terminal device in the tracking area or the cell corresponding to each of the one or more pieces of block information, fourth association information and the first data of the terminal device in the tracking area or the cell corresponding to each of the one or more pieces of block information. Then, the NWDAF determines, based on sixth information in the fourth association information, the first data of the terminal device in the tracking area or the cell corresponding to each of the one or more pieces of block information, the sixth information in the third association information, and the location information of the terminal device in the tracking area or the cell corresponding to each of the one or more pieces of block information, the location information and the first data of the terminal device in the tracking area or the cell corresponding to each of the one or more pieces of block information. Then, the NWDAF determines, based on the one or more pieces of block information, and the location information and the first data of the terminal device in the tracking area or the cell corresponding to each of the one or more pieces of block information, the first data of the terminal device in the coverage area of the block corresponding to each of the one or more pieces of block information. The fifth information herein refers to an intersection set of the first association information and the second association information. To be specific, the fifth information includes the globally unique identifier of the access network device, the identification information allocated by the access network device to the terminal device on the N2 interface, and the time information. The fourth association information herein refers to a union set of the first association information and the second association information. To be specific, the fourth association information includes the identification information of the terminal device, the globally unique identifier of the access network device, the identification information allocated by the access network device to the terminal device on the N2 interface, and the time information. The sixth information herein refers to an intersection set of the fourth association information and the third association information. To be specific, the sixth information includes the identification information of the terminal device and the time information.

In another implementation method, that the NWDAF determines, based on the first association information, the first data of the terminal device, the second association information, the third association information, and the location information of the terminal device in the tracking area or the cell corresponding to each of the one or more pieces of block information, the first data of the terminal device in the coverage area of the block corresponding to each of the one or more pieces of block information specifically includes: The NWDAF first determines, based on seventh information in the first association information, the seventh information in the third association information, and the location information of the terminal device in the tracking area or the cell corresponding to each of the one or more pieces of block information, fourth association information and the location information of the terminal device in the tracking area or the cell corresponding to each of the one or more pieces of block information. Then, the NWDAF determines, based on eighth information in the fourth association information, the location information of the terminal device in the tracking area or the cell corresponding to each of the one or more pieces of block information, the eighth information in the second association information, and the first data of the terminal device in the tracking area or the cell corresponding to each of the one or more pieces of block information, the location information and the first data of the terminal device in the tracking area or the cell corresponding to each of the one or more pieces of block information. Then, the NWDAF determines, based on the at least one piece of block information, and the location information and the first data of the terminal device in the tracking area or the cell corresponding to each of the one or more pieces of block information, the first data of the terminal device in the coverage area of the block corresponding to each of the one or more pieces of block information. The seventh information herein refers to an intersection set of the first association information and the third association information. To be specific, the seventh information includes the identification information of the terminal device and the time information. The fourth association information herein refers to a union set of the first association information and the third association information. To be specific, the fourth association information includes the identification information of the terminal device, the globally unique identifier of the access network device, the identification information allocated by the access network device to the terminal device on the N2 interface, and the time information. The eighth information herein refers to an intersection set of the fourth association information and the second association information. To be specific, the eighth information includes the globally unique identifier of the access network device, the identification information allocated by the access network device to the terminal device on the N2 interface, and the time information.

Specific descriptions about the implementation method 2 are described in detail in the following embodiment corresponding to FIG. 7.

Implementation method 3: The NWDAF determines identification information of a tracking area corresponding to each of the one or more pieces of block information or identification information of a cell corresponding to the block information. Alternatively, the NWDAF obtains, from an NEF network element, identification information of a tracking area corresponding to each of the one or more pieces of block information or identification information of a cell corresponding to the block information. Then, the NWDAF obtains, from an AMF network element, first association information and location information of a terminal device in the tracking area or the cell corresponding to each of the one or more pieces of block information. The NWDAF obtains, from a network management device or the access network device, second association information and first data of the terminal device in the tracking area or the cell corresponding to each of the one or more pieces of block information. Then, the NWDAF determines, based on the first association information, the location information of the terminal device in the tracking area or the cell corresponding to each of the one or more pieces of block information, the second association information, and the first data of the terminal device in the tracking area or the cell corresponding to each of the one or more pieces of block information, the first data of the terminal device in the coverage area of the block corresponding to each of the one or more pieces of block information.

That the NWDAF obtains, from an AMF network element, first association information and location information of a terminal device in the tracking area or the cell corresponding to each of the one or more pieces of block information specifically includes: The NWDAF sends, to the AMF network element, the identification information of the tracking area corresponding to each of the one or more pieces of block information or the identification information of the cell corresponding to the block information. Then, the AMF network element obtains the first association information and the location information of the terminal device in the tracking area or the cell, and sends the obtained first association information and the obtained location information of the terminal device in the tracking area or the cell to the NWDAF.

For a specific implementation method in which the NWDAF obtains, from the network management device or the access network device, the first data and the second association information of the terminal device in the tracking area or the cell corresponding to each of the one or more pieces of block information, refer to the descriptions in the implementation method 1.

In an implementation method, that the NWDAF determines, based on the first association information, the location information of the terminal device in the tracking area or the cell corresponding to each of the one or more pieces of block information, the second association information, and the first data of the terminal device in the tracking area or the cell corresponding to each of the one or more pieces of block information, the first data of the terminal device in the coverage area of the block corresponding to each of the one or more pieces of block information specifically includes: The NWDAF first determines, based on ninth information in the first association information, the ninth information in the second association information, the location information of the terminal device in the tracking area or the cell corresponding to each of the one or more pieces of block information, and the first data of the terminal device in the tracking area or the cell corresponding to each of the one or more pieces of block information, the location information and the first data of the terminal device in the tracking area or the cell corresponding to each of the one or more pieces of block information. Then, the NWDAF determines, based on the one or more pieces of block information, and the location information and the first data of the terminal device in the tracking area or the cell corresponding to each of the one or more pieces of block information, the first data of the terminal device in the coverage area of the block corresponding to each of the one or more pieces of block information. The ninth information herein refers to an intersection set of the first association information and the second association information. To be specific, the ninth information includes the globally unique identifier of the access network device, the identification information allocated by the access network device to the terminal device on the N2 interface, and the time information. The fourth association information herein refers to a union set of the first association information and the second association information. To be specific, the fourth association information includes the identification information of the terminal device, the globally unique identifier of the access network device, the identification information allocated by the access network device to the terminal device on the N2 interface, and the time information.

Specific descriptions about the implementation method 3 are described in detail in the following embodiment corresponding to FIG. 8.

Figure 6:
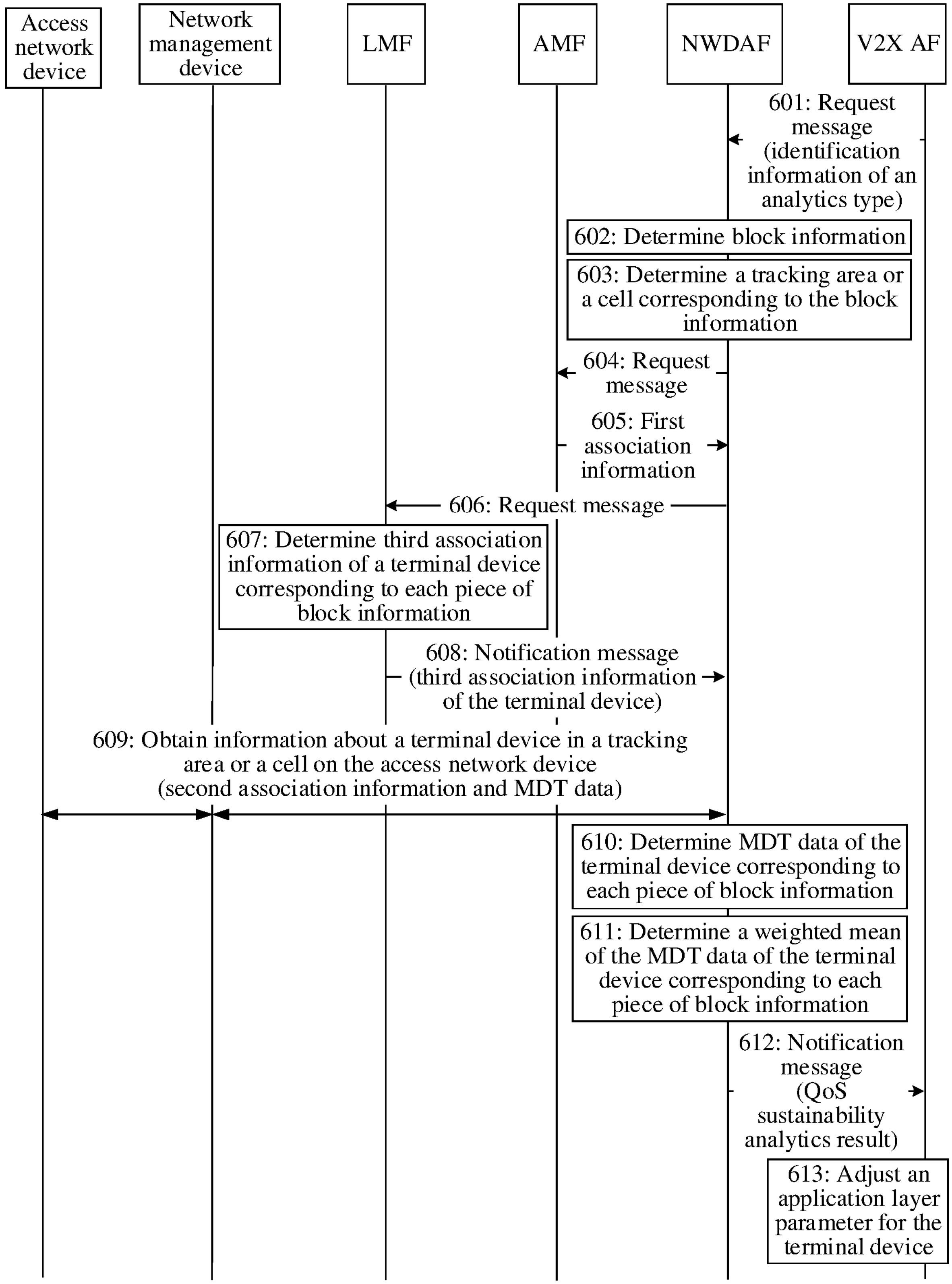
FIG. 6 is a schematic flowchart of a communication method according to an embodiment of this application.
Figure 7:
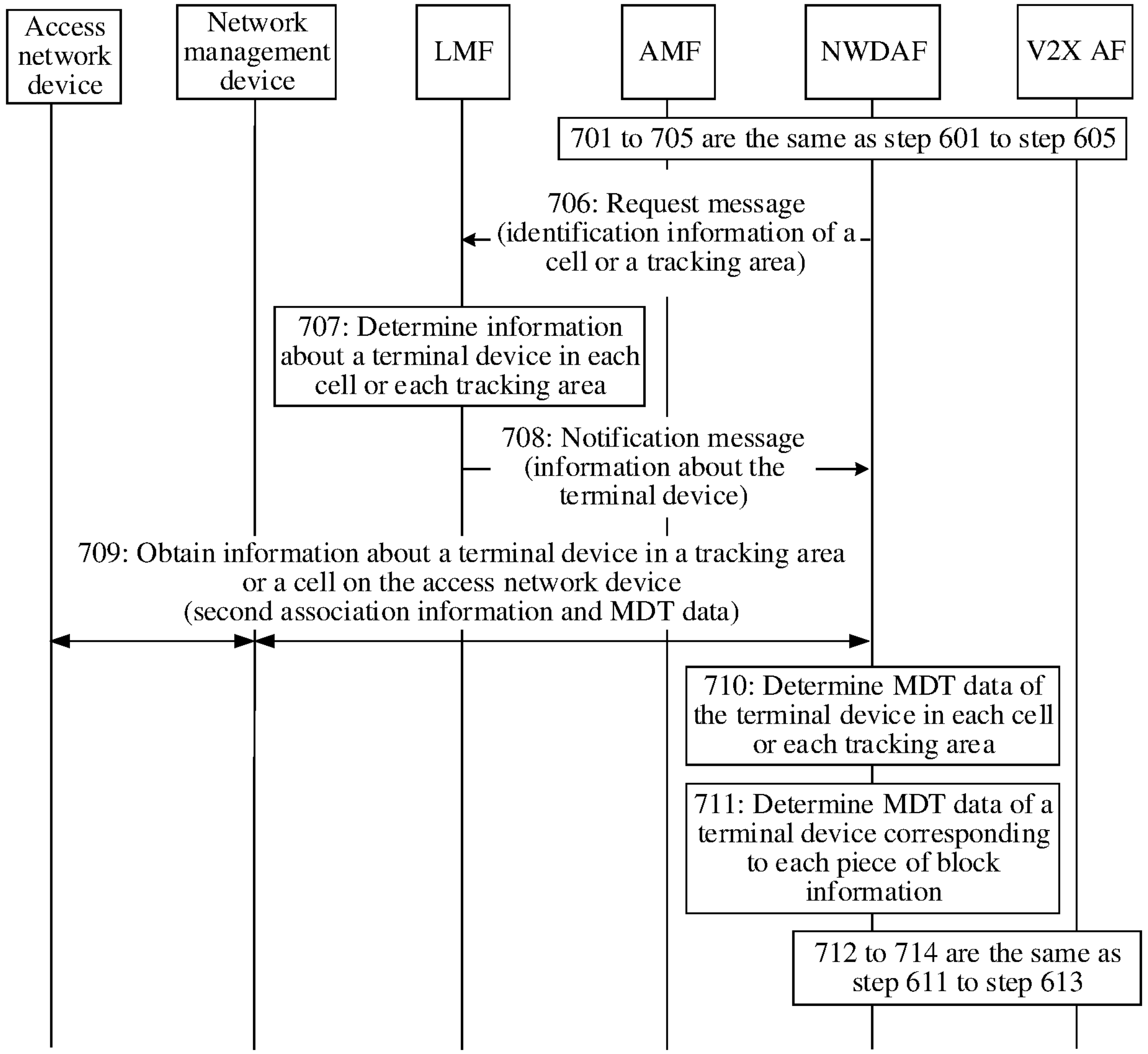
FIG. 7 is a schematic flowchart of a communication method according to an embodiment of this application.
Figure 8:
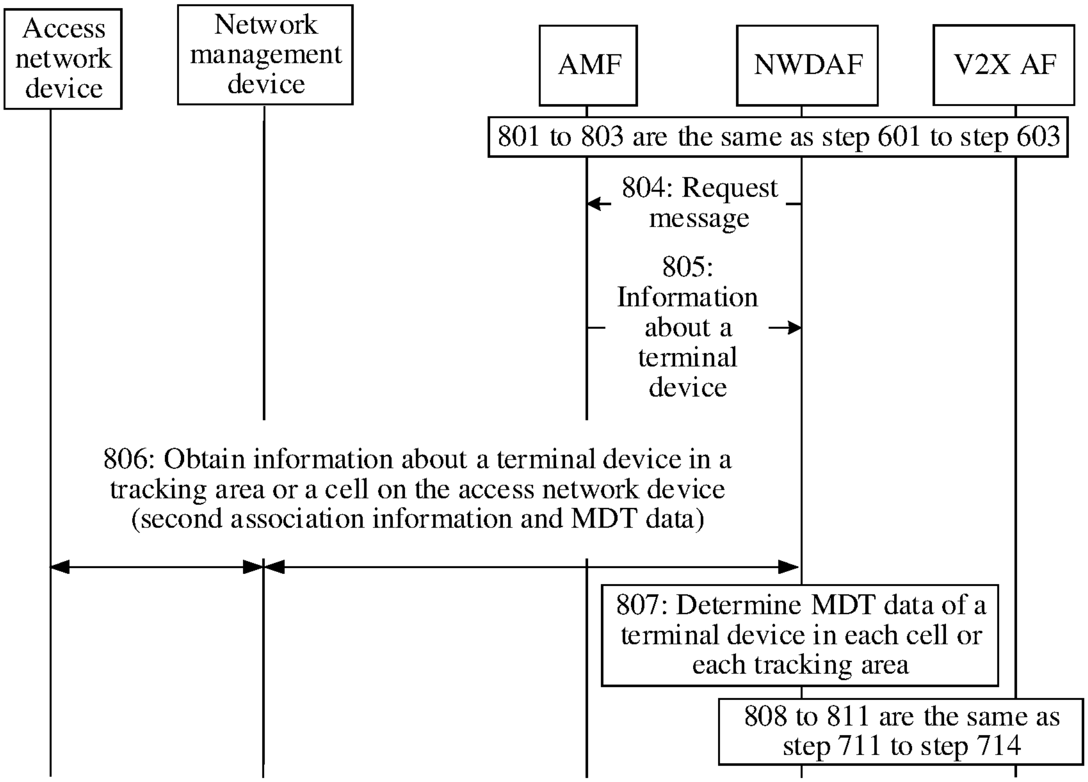
FIG. 8 is a schematic flowchart of a communication method according to an embodiment of this application.

The following specifically describes, with reference to specific embodiments shown in FIG. 6 to FIG. 8, the foregoing solutions corresponding to FIG. 5. In the following embodiments, an example in which a third-party network element is a V2X AF, and the V2X AF requests a quality of service sustainability (QoS Sustainability) analytics result from an NWDAF is used for description.

FIG. 6 is a schematic flowchart of a communication method according to an embodiment of this application. The method includes the following steps.

Step 601: A V2X AF sends a request message to an NWDAF. Correspondingly, the NWDAF receives the request message.

The request message may be a query request message or a subscription request message. The subscription request message may be, for example, an Nnwdaf_AnalyticsSubscription_Subscribe message.

The request message includes identification information (Analytics ID) of an analytics type, and the request message is used to request an analytics result corresponding to the analytics type. For example, the identification information of the analytics type is QoS sustainability.

In an implementation method, the request message further includes an analytics period, and the analytics period indicates a time interval at which the NWDAF generates an analytics result at a block granularity. In an implementation method, the analytics period further indicates a time interval at which the NWDAF returns the analytics result at the block granularity to the V2X AF. To be specific, after generating the analytics result at the block granularity based on the analytics period, the NWDAF sends the analytics result to the V2X AF. In another implementation method, the analytics period does not indicate a time interval at which the NWDAF returns the analytics result at the block granularity to the V2X AF. In this case, the NWDAF may determine when to return the analytics result at the block granularity to the V2X AF. For example, the NWDAF may return the analytics result at the block granularity to the V2X AF when determining that the analytics result at the block granularity meets a reporting threshold.

In an implementation method, the request message further includes a reporting threshold. The reporting threshold may include the first reporting threshold and/or the second reporting threshold in Table 3.

In an implementation method, the request message further includes identification information of a first terminal device. For example, the identification information of the first terminal device may be an SUPI.

In an implementation method, the request message further includes path information. The path information indicates a historical movement path of a terminal device, and/or indicates a future movement path of the terminal device. The path information may be represented by a group of longitude and latitude information. For example, the path information is represented as ((41° 24'N, 2° 10'E), (41°23'N, 2° 10'E), (41°23'N, 2° 11'E), (41°25'N, 2° 11'E), . . . ), where "N" represents the north latitude, and "E" represents the east longitude.

In an implementation method, if the request message includes the identification information of the first terminal device, the request message may further include step information, or certainly may not include the step information. If the request message includes the path information, the request message may further include step information, or certainly may not include the step information. For a meaning of the step information, refer to the descriptions in the embodiment corresponding to FIG. 5.

In an implementation method, the request message further includes one or more pieces of block information. The one or more pieces of block information are determined by the V2X AF, and the NWDAF may obtain the one or more pieces of block information from the request message.

The following provides various information that may be carried in the request message. The following provides some possible specific examples of the foregoing request message.

In a first example, the request message includes the identification information of the analytics type.

In a second example, the request message includes the identification information of the analytics type and the identification information of the first terminal device.

In a third example, the request message includes the identification information of the analytics type, the identification information of the first terminal device, and the step information.

In a fourth example, the request message includes the identification information of the analytics type and the path information.

In a fifth example, the request message includes the identification information of the analytics type, the path information, and the step information.

In a sixth example, the request message includes the identification information of the analytics type and the one or more pieces of block information.

In another example, the foregoing six examples may alternatively be combined with the analytics period and/or the reporting threshold to obtain another implementation method of the request message. In other words, in addition to the information in any one of the foregoing six examples, the request message further includes the analytics period and/or the reporting threshold. The first example is used as an example. The request message includes the identification information of the analytics type and the analytics period, includes the identification information of the analytics type and the reporting threshold, or includes the identification information of the analytics type, the analytics period, and the reporting threshold. The second example is used as an example. The request message includes the identification information of the analytics type, the identification information of the first terminal device, and the analytics period, includes the identification information of the analytics type, the identification information of the first terminal device, and the reporting threshold, or includes the identification information of the analytics type, the identification information of the first terminal device, the analytics period, and the reporting threshold. The rest is deduced by analogy.

It should be noted that in addition to the foregoing examples, the request message may further include another example. For example, the request message may simultaneously include two or three of the identification information of the first terminal device, the path information, or the one or more pieces of block information.

Step 602: The NWDAF determines block information.

The block information determined by the NWDAF may be one piece of block information, or may be a plurality of pieces of block information. The NWDAF may obtain the one or more pieces of block information from the request message, determine one piece of block information based on the identification information of the terminal device in the request message, or determine the one or more pieces of block information based on the path information in the request message. For a specific implementation method for determining the block information by the NWDAF, refer to the related descriptions in the embodiment corresponding to FIG. 5. Details are not described herein again.

Step 603: The NWDAF determines a tracking area or a cell corresponding to the block information.

In an implementation method, the NWDAF determines, based on a locally stored mapping relationship between the block information and the tracking area/cell, one or more tracking areas or one or more cells corresponding to each piece of block information.

In another implementation method, the NWDAF may send the block information to an NEF network element. Then, the NEF network element determines, based on the locally stored mapping relationship between the block information and the tracking area/cell, one or more tracking areas or one or more cells corresponding to each piece of block information. Then, the NEF network element sends identification information of the one or more determined tracking areas or identification information of the one or more determined cells to the NWDAF.

Step 604: The NWDAF sends a request message to an AMF. Correspondingly, the AMF receives the request message.

The request message includes identification information of a cell or identification information of a tracking area. The identification information of the cell is the identification information of the one or more cells that correspond to the block information and that are determined in step 603, and the identification information of the tracking area is the identification information of the one or more tracking areas that correspond to the block information and that are determined in step 603.

The request message is used to request information about a terminal device in the tracking area or request information about a terminal device in the cell. The information about the terminal device includes first association information. The first association information includes a SUPI, a RAN UE NGAP ID, a global RAN node ID, and a timestamp. Optionally, the RAN UE NGAP ID may be replaced with an AMF UE NGAP ID, and the global RAN node ID may be replaced with a GUAMI.

For example, the request message includes identification information of a cell 1, identification information of a cell 2, and identification information of a cell 3. The cell 1 is used as an example. If there are five terminal devices in the cell 1, the AMF obtains first association information of the five terminal devices. The first association information of the five terminal devices is separately as follows.

(1) First association information of a terminal device 1 includes a SUPI 1, a RAN UE NGAP ID 1, a global RAN node ID 1, and a timestamp 1.

(2) First association information of a terminal device 2 includes a SUPI 2, a RAN UE NGAP ID 2, a global RAN node ID 2, and a timestamp 2.

(3) First association information of a terminal device 3 includes a SUPI 3, a RAN UE NGAP ID 3, a global RAN node ID 3, and a timestamp 3.

(4) First association information of a terminal device 4 includes a SUPI 4, a RAN UE NGAP ID 4, a global RAN node ID 4, and a timestamp 4.

(5) First association information of a terminal device 5 includes a SUPI 5, a RAN UE NGAP ID 5, a global RAN node ID 5, and a timestamp 5.

Similarly, the AMF also obtains first association information of a terminal device in the cell 2 and obtains first association information of a terminal device in the cell 3.

Step 605: The AMF sends the first association information of the terminal device to the NWDAF. Correspondingly, the NWDAF receives the first association information of the terminal device.

The AMF sends, to the NWDAF, first association information of a terminal device in the one or more cells corresponding to the block information or first association information of a terminal device in the one or more tracking areas corresponding to the block information.

Step 606: The NWDAF sends a request message to an LMF. Correspondingly, the LMF receives the request message.

The request message includes an event identifier (Event ID), one or more pieces of block information, and identification information of one or more cells corresponding to each piece of block information or identification information of one or more tracking areas corresponding to the block information.

The event identifier identifies a type of a requested event, and the type of the event is information about a terminal device that camps on a block.

The one or more pieces of block information are the block information determined in step 602.

In an implementation method, the request message may be a subscription request message, and the subscription request message may be, for example, an Nlmf_EventExposure_Subscribe message.

Step 607: The LMF determines third association information of a terminal device corresponding to each piece of block information.

The third association information of the terminal device in a block corresponding to each piece of block information includes identification information (for example, a SUPI) of the terminal device and a timestamp. The timestamp identifies time at which the terminal device is located in a coverage area of the block corresponding to the block information. For example, the terminal device 1 is located in a block 1 at 16:30:59.

Specifically, the LMF determines, based on the one or more pieces of block information and the identification information of the one or more cells corresponding to each piece of block information or the identification information of the one or more tracking areas corresponding to the block information, a terminal device in the one or more cells or the one or more tracking areas corresponding to each piece of block information, then selects the terminal device in the block from the terminal device in the cell or the tracking area, and obtains the third association information of the terminal device corresponding to each piece of block information.

For example, the request message in step 606 includes block information 1 and the identification information of the cell 1 corresponding to the block information 1, and includes block information 2 and the identification information of the cell 1 corresponding to the block information 2. If LMF determines that there are five terminal devices in the cell 1: the terminal device 1 to the terminal device 5, and the LMF determines that the terminal device 1 and the terminal device 2 are located in a coverage area of a block corresponding to the block information 1, and determines that the terminal device 3 to the terminal device 5 are located in a coverage area of a block corresponding to the block information 2, the LMF determines that third association information of the terminal devices corresponding to the block information 1 includes third association information of the terminal device 1 and third association information of the terminal device 2, and determines that third association information of the terminal devices corresponding to the block information 2 includes third association information of the terminal device 3, third association information of the terminal device 4, and third association information of the terminal device 5. The third association information of the terminal device 1 to the terminal device 5 is separately as follows.

(1) The third association information of the terminal device 1 includes the SUPI 1 and the timestamp 1.

(2) The third association information of the terminal device 2 includes the SUPI 2 and the timestamp 2.

(3) The third association information of the terminal device 3 includes the SUPI 3 and the timestamp 3.

(4) The third association information of the terminal device 4 includes the SUPI 4 and the timestamp 4.

(5) The third association information of the terminal device 5 includes the SUPI 5 and the timestamp 5.

Step 608: The LMF sends a notification message to the NWDAF. Correspondingly, the NWDAF receives the notification message.

The notification message includes an event identifier, one or more pieces of block information, and third association information of a terminal device in a coverage area of a block corresponding to each piece of block information. The event identifier is the same as the event identifier in step 606. The one or more pieces of block information are the same as the block information in step 607.

In an implementation method, the notification message may be an Nlmf_EventExposure_Notify message.

Step 609: The NWDAF obtains information about a terminal device in a tracking area or a cell on an access network device through a network management device, where the information about the terminal device includes second association information and MDT data.

The tracking area or the cell herein is the tracking area or the cell that corresponds to the block information and that is determined in step 603.

The second association information includes the RAN UE NGAP ID, the global RAN node ID, and the timestamp. The MDT data includes a throughput (namely, an IP throughput) of the terminal device, or includes a quantity of abnormally released quality of service flows of the terminal device.

In other words, the access network device reports, to the network management device, the second association information and the MDT data of the terminal device in the tracking area or the cell that are measured by the access network device. Then, the NWDAF obtains the second association information and the MDT data of the terminal device from the network management device.

For example, there are five terminal devices in a cell 1 on the access network device, and the access network device reports information about the five terminal devices to the network management device. Information about each terminal device includes the second association information and the MDT data. Then, the NWDAF may obtain the information about the five terminal devices in the cell 1 from the network management device. The information about the five terminal devices is separately as follows.

(1) Information about the terminal device 1 includes MDT data 1 and second association information of the terminal device 1, and the second association information includes the RAN UE NGAP ID 1, the global RAN node ID 1, and the timestamp 1.

(2) Information about the terminal device 2 includes MDT data 2 and second association information of the terminal device 2, and the second association information includes the RAN UE NGAP ID 2, the global RAN node ID 2, and the timestamp 2.

(3) Information about the terminal device 3 includes MDT data 3 and second association information of the terminal device 3, and the second association information includes the RAN UE NGAP ID 3, the global RAN node ID 3, and the timestamp 3.

(4) Information about the terminal device 4 includes MDT data 4 and second association information of the terminal device 4, and the second association information includes the RAN UE NGAP ID 4, the global RAN node ID 4, and the timestamp 4.

(5) Information about the terminal device 5 includes MDT data 5 and second association information of the terminal device 5, and the second association information includes the RAN UE NGAP ID 5, the global RAN node ID 5, and the timestamp 5.

Step 610: The NWDAF determines MDT data in the coverage area of the block corresponding to each piece of block information.

Specifically, the NWDAF associates the information (namely, the second association information and the MDT data) about the terminal device from the access network device, the information (namely, the third association information) about the terminal device from the LMF, and the information (namely, the first association information) about the terminal device from the AMF, to obtain the MDT data of the terminal device in the coverage area of the block corresponding to each piece of block information. The following provides specific descriptions with reference to an example.

The cell 1 is used as an example. It is assumed that the information about the five terminal devices in the cell 1 may be obtained by performing step 605. The information about the five terminal devices is separately as follows.

(1) The first association information of the terminal device 1 includes the SUPI 1, the RAN UE NGAP ID 1, the global RAN node ID 1, and the timestamp 1.

(2) The first association information of the terminal device 2 includes the SUPI 2, the RAN UE NGAP ID 2, the global RAN node ID 2, and the timestamp 2.

(3) The first association information of the terminal device 3 includes the SUPI 3, the RAN UE NGAP ID 3, the global RAN node ID 3, and the timestamp 3.

(4) The first association information of the terminal device 4 includes the SUPI 4, the RAN UE NGAP ID 4, the global RAN node ID 4, and the timestamp 4.

(5) The first association information of the terminal device 5 includes the SUPI 5, the RAN UE NGAP ID 5, the global RAN node ID 5, and the timestamp 5.

The information about the terminal device 1 and the information about the terminal device 2 in the cell 1 corresponding to the block information 1, and the information about the terminal device 3, the information about the terminal device 4, and the information about the terminal device 5 in the cell 2 corresponding to the block information 1 may be obtained by performing step 608. The information is separately as follows.

(1) The third association information of the terminal device 1 includes the SUPI 1 and the timestamp 1.

(2) The third association information of the terminal device 2 includes the SUPI 2 and the timestamp 2.

(3) The third association information of the terminal device 3 includes the SUPI 3 and the timestamp 3.

(4) The third association information of the terminal device 4 includes the SUPI 4 and the timestamp 4.

(5) The third association information of the terminal device 5 includes the SUPI 5 and the timestamp 5.

Therefore, the NWDAF may associate the information about the terminal device from the AMF and the information about the terminal device from the LMF, to obtain the following information.

(1) Information about the terminal device 1 and information about the terminal device 2 in the cell 1 corresponding to the block information 1: The information about the terminal device 1 includes the SUPI 1, the RAN UE NGAP ID 1, the global RAN node ID 1, and the timestamp 1, and the information about the terminal device 2 includes the SUPI 2, the RAN UE NGAP ID 2, the global RAN node ID 2, and the timestamp 2.

(2) Information about the terminal device 3, information about the terminal device 4, and information about the terminal device 5 in the cell 1 corresponding to the block information 2: The information about the terminal device 3 includes the SUPI 3, the RAN UE NGAP ID 3, the global RAN node ID 3, and the timestamp 3, the information about the terminal device 4 includes the SUPI 4, the RAN UE NGAP ID 4, the global RAN node ID 4, and the timestamp 4, and the information about the terminal device 5 includes the SUPI 5, the RAN UE NGAP ID 5, the global RAN node ID 5, and the timestamp 5.

Further, the NWDAF associates the foregoing information with the information about the terminal device from the access network device, to obtain the following information.

(1) Information about the terminal device 1 and information about the terminal device 2 in the cell 1 corresponding to the block information 1: The information about the terminal device 1 includes the SUPI 1, the MDT data 1, the RAN UE NGAP ID 1, the global RAN node ID 1, and the timestamp 1, and the information about the terminal device 2 includes the SUPI 2, the MDT data 2, the RAN UE NGAP ID 2, the global RAN node ID 2, and the timestamp 2.

(2) Information about the terminal device 3, information about the terminal device 4, and information about the terminal device 5 in the cell 1 corresponding to the block information 2: The information about the terminal device 3 includes the SUPI 3, the MDT data 3, the RAN UE NGAP ID 3, the global RAN node ID 3, and the timestamp 3, the information about the terminal device 4 includes the SUPI 4, the MDT data 4, the RAN UE NGAP ID 4, the global RAN node ID 4, and the timestamp 4, and the information about the terminal device 5 includes the SUPI 5, the MDT data 5, the RAN UE NGAP ID 5, the global RAN node ID 5, and the timestamp 5.

Step 611: The NWDAF determines a weighted mean of the MDT data of the terminal device corresponding to each piece of block information.

An example in which the MDT data is the throughput of the terminal device is used. It is assumed that one piece of block information corresponds to N terminal devices, where N is an integer greater than or equal to 1. The NWDAF determines a weighted mean of throughputs of the N terminal devices based on the throughputs of the N terminal devices. The weighted mean is also referred to as an average throughput of the terminal devices.

An example in which the MDT data is the quantity of abnormally released quality of service flows of the terminal device is used. It is assumed that one piece of block information corresponds to N terminal devices, where N is an integer greater than or equal to 1. The NWDAF determines a weighted mean of quantities of abnormally released quality of service flows of the N terminal devices based on the quantities of abnormally released quality of service flows of the N terminal devices. The weighted mean is also referred to as a weighted average quantity of abnormally released quality of service flows of the terminal devices.

Step 612: The NWDAF sends the notification message to the V2X AF. Correspondingly, the V2X AF receives the notification message.

The notification message includes identification information of an analytics type and a QoS sustainability analytics result corresponding to one or more pieces of block information. The identification information of the analytics type is the same as the identification information of the analytics type in step 601.

Each piece of block information includes block identification information and/or a coverage area of a block corresponding to the block information.

The QoS sustainability analytics result corresponding to the block information includes indication information and/or a weighted mean of MDT data, and the indication information indicates whether the weighted mean of the MDT data corresponding to the block information is greater than the reporting threshold. For example, if the MDT data is the throughput of the terminal device, the QoS sustainability analytics result corresponding to the block information includes indication information and/or a weighted mean of throughputs of the terminal devices corresponding to the block information, and the indication information indicates whether the weighted mean of the throughputs of the terminal devices corresponding to the block information is greater than the first reporting threshold. For another example, if the MDT data is the quantity of abnormally released quality of service flows of the terminal device, the QoS sustainability analytics result corresponding to the block information includes indication information and/or a weighted mean of the quantities of abnormally released QoS flows of the terminal devices corresponding to the block information, and the indication information indicates whether the weighted mean of the quantities of abnormally released QoS flows of the terminal devices corresponding to the block information is greater than the second reporting threshold.

Step 613: The V2X AF determines, based on location information of a terminal device, block information corresponding to the terminal device, and adjusts an application layer parameter of the terminal device based on a QoS sustainability analytics result corresponding to the block information.

The block information and the QoS sustainability analytics result corresponding to the block information are received from the notification message in step 612.

Adjusting the application layer parameter herein includes but is not limited to adjusting an inter-vehicle distance, adjusting a coding scheme, adjusting a coding parameter, and adjusting an autonomous driving level.

According to the foregoing solution, the NWDAF may obtain a QoS sustainability analytics result that is of the terminal device and that is at the block granularity, to increase precision of the QoS sustainability analytics result. The NWDAF sends the QoS sustainability analytics result to the V2X AF, to assist the V2X AF in performing an application layer parameter adjustment operation at the block granularity. This increases accuracy of application layer parameter adjustment and enhances practical value of the QoS sustainability analytics result for the V2X AF.

FIG. 7 is a schematic flowchart of a communication method according to an embodiment of this application. The method includes the following steps.

Step 701 to step 705 are the same as step 601 to step 605.

Step 706: An NWDAF sends a request message to an LMF. Correspondingly, the LMF receives the request message.

The request message includes an event identifier (Event ID), and includes identification information of a cell or identification information of a tracking area. The cell or the tracking area herein is a cell or a tracking area that corresponds to block information and that is determined in step 703.

The event identifier identifies a type of a requested event, and the type of the event is information about a terminal device that camps on the cell or the tracking area.

In an implementation method, the request message may be a subscription request message, and the subscription request message may be, for example, an Nlmf_EventExposure_Subscribe message.

Step 707: The LMF determines information about a terminal device in each cell or each tracking area.

The information about the terminal device in each cell or each tracking area includes third association information and location information. The third association information includes identification information (for example, a SUPI) of the terminal device and a timestamp. The timestamp identifies time at which the terminal device is located in the cell or the tracking area. For example, a terminal device 1 is located in a cell 1 or a tracking area 1 at 16:30:59.

For example, the request message in step 706 includes identification information of the cell 1. The LMF determines that there are five terminal devices in the cell 1: the terminal device 1 to a terminal device 5. In this case, it is determined that information about the terminal devices in the cell 1 includes information about the terminal device 1, information about the terminal device 2, information about the terminal device 3, information about the terminal device 4, and information about the terminal device 5. The information about the terminal device 1 to the terminal device 5 is separately as follows.

(1) The information about the terminal device 1 includes location information 1 and third association information, and the third association information includes a SUPI 1 and a timestamp 1.

(2) The information about the terminal device 2 includes location information 2 and third association information, and the third association information includes a SUPI 2 and a timestamp 2.

(3) The information about the terminal device 3 includes location information 3 and third association information, and the third association information includes a SUPI 3 and a timestamp 3.

(4) The information about the terminal device 4 includes location information 4 and third association information, and the third association information includes a SUPI 4 and a timestamp 4.

(5) The information about the terminal device 5 includes location information 5 and third association information, and the third association information includes a SUPI 5 and a timestamp 5.

Step 708: The LMF sends a notification message to the NWDAF. Correspondingly, the NWDAF receives the notification message.

The notification message includes an event identifier, and information about a terminal device in one or more cells or one or more tracking areas. The information about the terminal device includes location information and third association information of the terminal device. For details, refer to the descriptions in step 707. The event identifier is the same as the event identifier in step 706.

In an implementation method, the notification message may be an Nlmf_EventExposure_Notify message.

Step 709 is the same as step 609.

Step 710: The NWDAF determines MDT data corresponding to each cell or each tracking area.

Specifically, the NWDAF associates information (namely, second association information and MDT data) about a terminal device from an access network device, information (namely, the third association information and the location information of the terminal device) about the terminal device from the LMF, and information (namely, first association information) about a terminal device from an AMF, to obtain the MDT data of the terminal device corresponding to each cell or each tracking area. The following provides specific descriptions with reference to an example.

The cell 1 is used as an example. It is assumed that the information about the five terminal devices in the cell 1 may be obtained by performing step 705. The information about the five terminal devices is separately as follows.

(1) First association information of the terminal device 1 includes the SUPI 1, a RAN UE NGAP ID 1, a global RAN node ID 1, and the timestamp 1.

(2) First association information of the terminal device 2 includes the SUPI 2, a RAN UE NGAP ID 2, a global RAN node ID 2, and the timestamp 2.

(3) First association information of the terminal device 3 includes the SUPI 3, a RAN UE NGAP ID 3, a global RAN node ID 3, and the timestamp 3.

(4) First association information of the terminal device 4 includes the SUPI 4, a RAN UE NGAP ID 4, a global RAN node ID 4, and the timestamp 4.

(5) First association information of the terminal device 5 includes the SUPI 5, a RAN UE NGAP ID 5, a global RAN node ID 5, and the timestamp 5.

The information about the terminal device 1, the information about the terminal device 2, the information about the terminal device 3, the information about the terminal device 4, and the information about the terminal device 5 in the cell 1 may be obtained by performing step 708.

The information is separately as follows.

(1) The information about the terminal device 1 includes the location information 1 and the third association information, and the third association information includes the SUPI 1 and the timestamp 1.

(2) The information about the terminal device 2 includes the location information 2 and the third association information, and the third association information includes the SUPI 2 and the timestamp 2.

(3) The information about the terminal device 3 includes the location information 3 and the third association information, and the third association information includes the SUPI 3 and the timestamp 3.

(4) The information about the terminal device 4 includes the location information 4 and the third association information, and the third association information includes the SUPI 4 and the timestamp 4.

(5) The information about the terminal device 5 includes the location information 5 and the third association information, and the third association information includes the SUPI 5 and the timestamp 5.

Therefore, the NWDAF may associate the information about the terminal device from the AMF and the information about the terminal device from the LMF, to obtain the following information.

The information about the terminal device 1, the information about the terminal device 2, the information about the terminal device 3, the information about the terminal device 4, and the information about the terminal device 5 in the cell 1.

(1) The information about the terminal device 1 includes the location information 1, the SUPI 1, the RAN UE NGAP ID 1, the global RAN node ID 1, and the timestamp 1.

(2) The information about the terminal device 2 includes the location information 2, the SUPI 2, the RAN UE NGAP ID 2, the global RAN node ID 2, and the timestamp 2.

(3) The information about the terminal device 3 includes the location information 3, the SUPI 3, the RAN UE NGAP ID 3, the global RAN node ID 3, and the timestamp 3.

(4) The information about the terminal device 4 includes the location information 4, the SUPI 4, the RAN UE NGAP ID 4, the global RAN node ID 4, and the timestamp 4.

(5) The information about the terminal device 5 includes the location information 5, the SUPI 5, the RAN UE NGAP ID 5, the global RAN node ID 5, and the timestamp 5.

Further, the NWDAF associates the foregoing information with the information (namely, the second association information and the MDT data) about the terminal device from the access network device, to obtain the following information.

(1) The information about the terminal device 1 includes the location information 1, MDT data 1, the SUPI 1, the RAN UE NGAP ID 1, the global RAN node ID 1, and the timestamp 1.

(2) The information about the terminal device 2 includes the location information 2, MDT data 2, the SUPI 2, the RAN UE NGAP ID 2, the global RAN node ID 2, and the timestamp 2.

(3) The information about the terminal device 3 includes the location information 3, MDT data 3, the SUPI 3, the RAN UE NGAP ID 3, the global RAN node ID 3, and the timestamp 3.

(4) The information about the terminal device 4 includes the location information 4, MDT data 4, the SUPI 4, the RAN UE NGAP ID 4, the global RAN node ID 4, and the timestamp 4.

(5) The information about the terminal device 5 includes the location information 5, MDT data 5, the SUPI 5, the RAN UE NGAP ID 5, the global RAN node ID 5, and the timestamp 5.

Step 711: The NWDAF determines MDT data corresponding to each piece of block information.

Specifically, the NWDAF determines, based on a coverage area of a block in block information determined in step 702, and the location information and the MDT data of the terminal device in each tracking area or each cell that are determined in step 710, MDT data in a coverage area of a block corresponding to each piece of block information.

The example of step 710 is used as an example. If a block range of block information 1 includes a location 1 corresponding to the location information 1 and a location 2 corresponding to the location information 2, and a block range of block information 2 includes a location 3 corresponding to the location information 3, a location 4 corresponding to the location information 4, and a location 5 corresponding to the location information 5, the NWDAF determines that MDT data corresponding to the block information 1 includes the MDT data 1 and the MDT data 2, and MDT data corresponding to the block information 2 includes the MDT data 3, the MDT data 4, and the MDT data 5.

Step 712 to step 714 are the same as step 611 to step 613.

According to the foregoing solution, the NWDAF may obtain a QoS sustainability analytics result that is of the terminal device and that is at a block granularity, to increase precision of the QoS sustainability analytics result. The NWDAF sends the QoS sustainability analytics result to a V2X AF, to assist the V2X AF in performing an application layer parameter adjustment operation at the block granularity. This increases accuracy of application layer parameter adjustment and enhances practical value of the QoS sustainability analytics result for the V2X AF.

A main difference between the embodiment corresponding to FIG. 7 and the embodiment corresponding to FIG. 6 is as follows: In the embodiment corresponding to FIG. 6, the LMF collects the information about the terminal device in the cell/tracking area, then filters the collected information about the terminal device in the cell/tracking area based on the block information, to obtain the information about the terminal device in the coverage area of the block corresponding to the block information, where the information about the terminal device does not include the location information of the terminal device. Then, the LMF sends, to the NWDAF, the information about the terminal device corresponding to the block information. In the embodiment corresponding to FIG. 7, the LMF collects the information about the terminal device in the cell/tracking area, and sends the information about the terminal device in the cell/tracking area to the NWDAF, where the information about the terminal device includes the location information of the terminal device. Then, the NWDAF filters the collected information about the terminal device in the cell/tracking area based on the location information of the terminal device and the block information, to obtain the information about the terminal device in the coverage area of the block corresponding to the block information.

FIG. 8 is a schematic flowchart of a communication method according to an embodiment of this application. The method includes the following steps.

Step 801 to step 803 are the same as step 601 to step 603.

Step 804: An NWDAF sends a request message to an AMF. Correspondingly, the AMF receives the request message.

The request message includes identification information of a cell or identification information of a tracking area. The identification information of the cell is identification information of one or more cells that correspond to block information and that are determined in step 803, and the identification information of the tracking area is identification information of one or more tracking areas that correspond to the block information and that are determined in step 803.

The request message is used to request information about a terminal device in the tracking area or request information about a terminal device in the cell. The information about the terminal device includes location information and first association information of the terminal device. The first association information includes a SUPI, a RAN UE NGAP ID, a global RAN node ID, and a timestamp.

For example, the request message includes identification information of a cell 1, identification information of a cell 2, and identification information of a cell 3. The cell 1 is used as an example. If there are five terminal devices in the cell 1, the AMF obtains information about the five terminal devices. The information about the five terminal devices is separately as follows.

(1) Information about a terminal device 1 includes location information 1 and first association information, and the first association information includes a SUPI 1, a RAN UE NGAP ID 1, a global RAN node ID 1, and a timestamp 1.

(2) Information about a terminal device 2 includes location information 2 and first association information, and the first association information includes a SUPI 2, a RAN UE NGAP ID 2, a global RAN node ID 2, and a timestamp 2.

(3) Information about a terminal device 3 includes location information 3 and first association information, and the first association information includes a SUPI 3, a RAN UE NGAP ID 3, a global RAN node ID 3, and a timestamp 3.

(4) Information about a terminal device 4 includes location information 4 and first association information, and the first association information includes a SUPI 4, a RAN UE NGAP ID 4, a global RAN node ID 4, and a timestamp 4.

(5) Information about a terminal device 5 includes location information 5 and first association information, and the first association information includes a SUPI 5, a RAN UE NGAP ID 5, a global RAN node ID 5, and a timestamp 5.

Similarly, the AMF also obtains information about a terminal device in the cell 2 and obtains information about a terminal device in the cell 3.

In an implementation method, the AMF may obtain the location information of the terminal device in the cell or the tracking area from an LMF.

Step 805: The AMF sends the information about the terminal device to the NWDAF. Correspondingly, the NWDAF receives the information about the terminal device.

The AMF sends the information about the terminal device in the cell, or the information about the terminal device in the tracking area to the NWDAF.

Step 806 is the same as step 709.

Step 807: The NWDAF determines MDT data corresponding to each cell or each tracking area.

Specifically, the NWDAF associates information (namely, the first association information and the location information of the terminal device) about a terminal device from an access network device and information (namely, second association information and MDT data) about the terminal device from the AMF, to obtain the MDT data of the terminal device corresponding to each cell or each tracking area. The following provides specific descriptions with reference to an example.

The cell 1 is used as an example. It is assumed that the information about the five terminal devices in the cell 1 may be obtained by performing step 805. The information about the five terminal devices is separately as follows.

(1) The information about the terminal device 1 includes the location information 1 and the first association information, and the first association information includes the SUPI 1, the RAN UE NGAP ID 1, the global RAN node ID 1, and the timestamp 1.

(2) The information about the terminal device 2 includes the location information 2 and the first association information, and the first association information includes the SUPI 2, the RAN UE NGAP ID 2, the global RAN node ID 2, and the timestamp 2.

(3) The information about the terminal device 3 includes the location information 3 and the first association information, and the first association information includes the SUPI 3, the RAN UE NGAP ID 3, the global RAN node ID 3, and the timestamp 3.

(4) The information about the terminal device 4 includes the location information 4 and the first association information, and the first association information includes the SUPI 4, the RAN UE NGAP ID 4, the global RAN node ID 4, and the timestamp 4.

(5) The information about the terminal device 5 includes the location information 5 and the first association information, and the first association information includes the SUPI 5, the RAN UE NGAP ID 5, the global RAN node ID 5, and the timestamp 5.

The information about the terminal device 1, the information about the terminal device 2, the information about the terminal device 3, the information about the terminal device 4, and the information about the terminal device 5 in the cell 1 may be obtained by performing step 806. The information is separately as follows.

(1) The information about the terminal device 1 includes MDT data 1 and second association information, and the second association information includes the RAN UE NGAP ID 1, the global RAN node ID 1, and the timestamp 1.

(2) The information about the terminal device 2 includes MDT data 2 and second association information, and the second association information includes the RAN UE NGAP ID 2, the global RAN node ID 2, and the timestamp 2.

(3) The information about the terminal device 3 includes MDT data 3 and second association information, and the second association information includes the RAN UE NGAP ID 3, the global RAN node ID 3, and the timestamp 3.

(4) The information about the terminal device 4 includes MDT data 4 and second association information, and the second association information includes the RAN UE NGAP ID 4, the global RAN node ID 4, and the timestamp 4.

(5) The information about the terminal device 5 includes MDT data 5 and second association information, and the second association information includes the RAN UE NGAP ID 5, the global RAN node ID 5, and the timestamp 5.

Therefore, the NWDAF may associate the information about the terminal device from the AMF and the information about the terminal device from the access network device, to obtain the information about the terminal device 1, the information about the terminal device 2, the information about the terminal device 3, the information about the terminal device 4, and the information about the terminal device 5 in the cell 1.

(1) The information about the terminal device 1 includes the location information 1, the MDT data 1, the SUPI 1, the RAN UE NGAP ID 1, the global RAN node ID 1, and the timestamp 1.

(2) The information about the terminal device 2 includes the location information 2, the MDT data 2, the SUPI 2, the RAN UE NGAP ID 2, the global RAN node ID 2, and the timestamp 2.

(3) The information about the terminal device 3 includes the location information 3, the MDT data 3, the SUPI 3, the RAN UE NGAP ID 3, the global RAN node ID 3, and the timestamp 3.

(4) The information about the terminal device 4 includes the location information 4, the MDT data 4, the SUPI 4, the RAN UE NGAP ID 4, the global RAN node ID 4, and the timestamp 4.

(5) The information about the terminal device 5 includes the location information 5, the MDT data 5, the SUPI 5, the RAN UE NGAP ID 5, the global RAN node ID 5, and the timestamp 5.

Step 808 to step 811 are the same as step 711 to step 714.

According to the foregoing solution, the NWDAF may obtain a QoS sustainability analytics result that is of the terminal device and that is at a block granularity, to increase precision of the QoS sustainability analytics result. The NWDAF sends the QoS sustainability analytics result to a V2X AF, to assist the V2X AF in performing an application layer parameter adjustment operation at the block granularity. This increases accuracy of application layer parameter adjustment and enhances practical value of the QoS sustainability analytics result for the V2X AF.

A main difference between the embodiment corresponding to FIG. 8 and the embodiment corresponding to FIG. 7 is as follows: In the embodiment corresponding to FIG. 7, the NWDAF interacts with the LMF, to obtain the location information of the terminal device in the cell or the tracking area from the LMF, while in the embodiment corresponding to FIG. 8, the NWDAF does not need to interact with the LMF, and the NWDAF may obtain the location information of the terminal device in the cell or the tracking area from the AMF.

It may be understood that to implement functions in the foregoing embodiments, the data analytics network element, the core network element, the third-party network element, or the location management network element includes corresponding hardware structures and/or corresponding software modules for performing the functions. A person skilled in the art should be easily aware that in combination with the units and the method steps in the examples described in embodiments disclosed in this application, this application can be implemented by using hardware or a combination of the hardware and computer software. Whether a function is performed by using the hardware or the hardware driven by the computer software depends on a particular application scenario and a design constraint of the technical solutions.

Figure 9:
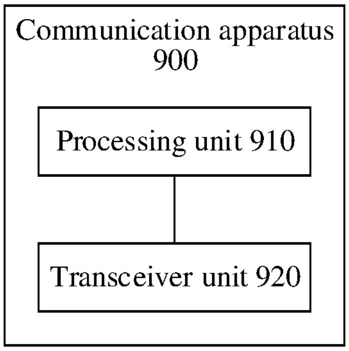
FIG. 9 is a schematic diagram of a communication apparatus according to an embodiment of this application.
Figure 10:
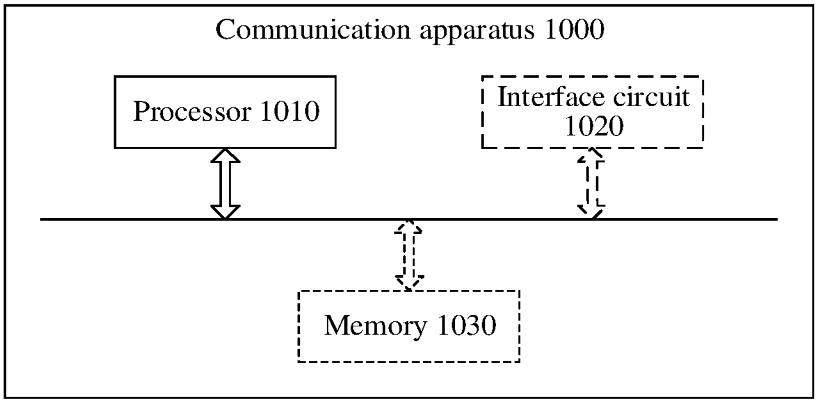
FIG. 10 is a schematic diagram of a communication apparatus according to an embodiment of this application.

FIG. 9 and FIG. 10 are schematic diagrams of structures of possible communication apparatuses according to embodiments of this application. These communication apparatuses may be configured to implement functions of the data analytics network element, the core network element, the third-party network element, or the location management network element in the foregoing method embodiments, and therefore can also implement advantageous effects of the foregoing method embodiments. In embodiments of this application, the communication apparatus may be a data analytics network element, a core network element, a third-party network element, or a location management network element, or may be a module (for example, a chip) used in the data analytics network element, the core network element, the third-party network element, or the location management network element.

As shown in FIG. 9, a communication apparatus 900 includes a processing unit 910 and a transceiver unit 920. The communication apparatus 900 is configured to implement functions of the data analytics network element, the core network element, the third-party network element, or the location management network element in the foregoing method embodiments.

In a first embodiment, the communication apparatus is configured to implement the function of the data analytics network element in the foregoing method embodiments. The processing unit 910 is configured to receive: a request message from a core network element or a third-party network element by using the transceiver unit 920, where the request message is used to request an analytics result; and send, to the core network element or the third-party network element, block information and an analytics result corresponding to the block information, where a coverage area of a block corresponding to the block information is smaller than a coverage area of a cell.

In a possible implementation method, the request message includes identification information of a first terminal device, and the request message is specifically used to request an analytics result of the first terminal device. The processing unit 910 is further configured to: obtain location information of the first terminal device from a location management network element; and determine the block information based on step information and the location information of the first terminal device, where the first terminal device is located in the coverage area of the block corresponding to the block information.

In a possible implementation method, the request message includes path information. The processing unit 910 is further configured to: A data analytics network element determines the block information based on the step information and the path information.

In a possible implementation method, the request message further includes the step information; or the processing unit 910 is further configured to determine the step information.

In a possible implementation method, the step information includes a step and/or block type information.

In a possible implementation method, the request message includes the block information.

In a possible implementation method, the processing unit 910 is further configured to: determine first data of the terminal device in the coverage area of the block corresponding to the block information; and determine the analytics result based on the first data.

In a possible implementation method, the analytics result includes indication information and/or a weighted mean of the first data of the terminal device in the coverage area of the block corresponding to the block information, and the indication information indicates whether the weighted mean of the first data of the terminal device in the coverage area of the block corresponding to the block information is greater than a preset threshold.

In a possible implementation method, the first data includes a throughput of the terminal device; or the first data includes a quantity of abnormally released quality of service flows of the terminal device.

In a possible implementation method, the processing unit 910 is specifically configured to: obtain, from a mobility management network element by using the transceiver unit 920, first association information of a terminal device in a tracking area or a cell corresponding to the block information; obtain, from a network management device or an access network device by using the transceiver unit 920, first data and second association information of the terminal device in the tracking area or the cell corresponding to the block information; obtain, from the location management network element by using the transceiver unit 920, third association information of the terminal device in the coverage area of the block corresponding to the block information; and determine, based on the first association information, the second association information, the third association information, and the first data of the terminal device in the tracking area or the cell corresponding to the block information, the first data of the terminal device in the coverage area of the block corresponding to the block information.

In a possible implementation method, the processing unit 910 is specifically configured to: determine, based on first information in the first association information, the first information in the second association information, and the first data of the terminal device in the tracking area or the cell corresponding to the block information, the first data and fourth association information of the terminal device in the tracking area or the cell corresponding to the block information; and determine, based on second information in the fourth association information, the second information in the third association information, and the first data of the terminal device in the tracking area or the cell corresponding to the block information, the first data of the terminal device in the coverage area of the block corresponding to the block information.

In a possible implementation method, the processing unit 910 is specifically configured to: determine, based on third information in the first association information and the third information in the third association information, fourth association information of the terminal device in the coverage area of the block corresponding to the block information; and determine, based on fourth information in the fourth association information, the fourth information in the second association information, and the first data of the terminal device in the tracking area or the cell corresponding to the block information, the first data of the terminal device in the coverage area of the block corresponding to the block information.

In a possible implementation method, the processing unit 910 is specifically configured to: obtain, from the mobility management network element by using the transceiver unit 920, the first association information of the terminal device in the tracking area or the cell corresponding to the block information; obtain, from the network management device or the access network device by using the transceiver unit 920, the first data and the second association information of the terminal device in the tracking area or the cell corresponding to the block information; obtain, from the location management network element by using the transceiver unit 920, third association information and location information of the terminal device in the tracking area or the cell corresponding to the block information; and determine, based on the first association information, the first data of the terminal device, the second association information, the third association information, and the location information of the terminal device in the tracking area or the cell corresponding to the block information, the first data of the terminal device in the coverage area of the block corresponding to the block information.

In a possible implementation method, the processing unit 910 is specifically configured to: determine, based on fifth information in the first association information, the fifth information in the second association information, and the first data of the terminal device in the tracking area or the cell corresponding to the block information, the fourth association information and the first data of the terminal device in the tracking area or the cell corresponding to the block information; determine, based on sixth information in the fourth association information, the first data of the terminal device in the tracking area or the cell corresponding to the block information, the sixth information in the third association information, and the location information of the terminal device in the tracking area or the cell corresponding to the block information, the location information and the first data of the terminal device in the tracking area or the cell corresponding to the block information; and determine, based on the block information, and the location information and the first data of the terminal device in the tracking area or the cell corresponding to the block information, the first data of the terminal device in the coverage area of the block corresponding to the block information.

In a possible implementation method, the processing unit 910 is specifically configured to: determine, based on seventh information in the first association information, the seventh information in the third association information, and the location information of the terminal device in the tracking area or the cell corresponding to the block information, the fourth association information and the location information of the terminal device in the tracking area or the cell corresponding to the block information; determine, based on eighth information in the fourth association information, the location information of the terminal device in the tracking area or the cell corresponding to the block information, the eighth information in the second association information, and the first data of the terminal device in the tracking area or the cell corresponding to the block information, the location information and the first data of the terminal device in the tracking area or the cell corresponding to the block information; and determine, based on the block information, and the location information and the first data of the terminal device in the tracking area or the cell corresponding to the block information, the first data of the terminal device in the coverage area of the block corresponding to the block information.

In a possible implementation method, the processing unit 910 is specifically configured to: obtain, from the mobility management network element by using the transceiver unit 920, the first association information and the location information of the terminal device in the tracking area or the cell corresponding to the block information; obtain, from the network management device or the access network device by using the transceiver unit 920, the second association information and the first data of the terminal device in the tracking area or the cell corresponding to the block information; and determine, based on the first association information, the location information of the terminal device in the tracking area or the cell corresponding to the block information, the second association information, and the first data of the terminal device in the tracking area or the cell corresponding to the block information, the first data of the terminal device in the coverage area of the block corresponding to the block information.

In a possible implementation method, the processing unit 910 is specifically configured to: determine, based on ninth information in the first association information, the ninth information in the second association information, the location information of the terminal device in the tracking area or the cell corresponding to the block information, and the first data of the terminal device in the tracking area or the cell corresponding to the block information, the location information and the first data of the terminal device in the tracking area or the cell corresponding to the block information; and determine, based on the block information, and the location information and the first data of the terminal device in the tracking area or the cell corresponding to the block information, the first data of the terminal device in the coverage area of the block corresponding to the block information.

In a possible implementation method, the processing unit 910 is further configured to: determine identification information of the tracking area corresponding to the block information or identification information of the cell corresponding to the block information; or obtain, from the network exposure network element, identification information of the tracking area or identification information of the cell corresponding to the block information.

In a possible implementation method, the first association information includes identification information of the terminal device, a globally unique identifier of the access network device, identification information allocated by the access network device to the terminal device on an N2 interface, and time information. The second association information includes the globally unique identifier of the access network device, the identification information allocated by the access network device to the terminal device on the N2 interface, and the time information. The third association information includes the identification information of the terminal device and the time information.

In a possible implementation method, the block information includes block identification information and/or the coverage area of the block corresponding to the block information.

In a second embodiment, the communication apparatus is configured to implement the function of the core network element or the third-party network element in the foregoing method embodiments. The processing unit 910 is configured to: send a request message to a data analytics network element by using the transceiver unit 920, where the request message is used to request an analytics result; and receive, from the data analytics network element, block information and an analytics result corresponding to the block information, where a coverage area of a block corresponding to the block information is smaller than a coverage area of a cell.

In a possible implementation method, the request message includes identification information of a first terminal device, and the request message is specifically used to request an analytics result of the first terminal device.

In a possible implementation method, the request message includes path information, and the request message is specifically used to request an analytics result of a block corresponding to the path information.

In a possible implementation method, the request message further includes step information. The step information includes a step and/or block type information. The step information is used to determine the block information.

In a possible implementation method, the request message includes the block information.

In a possible implementation method, the analytics result includes indication information and/or a weighted mean of first data of the terminal device in the coverage area of the block corresponding to the block information, and the indication information indicates whether the weighted mean of the first data of the terminal device in the coverage area of the block corresponding to the block information is greater than a preset threshold.

In a possible implementation method, the block information includes block identification information and/or the coverage area of the block corresponding to the block information.

In a third embodiment, the communication apparatus is configured to implement the function of the location management network element in the foregoing method embodiments. The transceiver unit 920 is configured to receive a request message from a data analytics network element, where the request message includes block information and identification information of a tracking area corresponding to block information or identification information of a cell corresponding to block information, the request message is used to request association information of a terminal device in a coverage area of a block corresponding to the block information, and the coverage area of the block corresponding to the block information is smaller than a coverage area of the cell. The processing unit 910 is configured to obtain location information of a terminal device in the tracking area or the cell corresponding to the block information. The location management network element selects, from the terminal device in the tracking area or the cell based on the block information and the location information of the terminal device in the tracking area or the cell corresponding to the block information, the terminal device in the coverage area of the block corresponding to the block information. The transceiver unit 920 is further configured to send, to the data analytics network element, the association information of the terminal device in the coverage area of the block corresponding to the block information.

In a possible implementation method, the association information includes time information and identification information of the terminal device.

In a possible implementation method, the request message further includes an event identifier. The event identifier identifies a type of a requested event. The type of the event is association information of the terminal device that camps on a block.

In a possible implementation method, the block information includes block identification information and/or the coverage area of the block corresponding to the block information.

For more detailed descriptions about the processing unit 910 and the transceiver unit 920, directly refer to the related descriptions in the foregoing method embodiments. Details are not described herein again.

As shown in FIG. 10, a communication apparatus 1000 includes a processor 1010. In an implementation method, the communication apparatus 1000 further includes an interface circuit 1020. The processor 1010 and the interface circuit 1020 are coupled to each other. It may be understood that the interface circuit 1020 may be a transceiver or an input/output interface. In an implementation method, the communication apparatus 1000 may further include a memory 1030, configured to store instructions executed by the processor 1010, store input data needed for running the instructions by the processor 1010, or store data generated after the processor 1010 runs the instructions.

When the communication apparatus 1000 is configured to implement the foregoing method embodiments, the processor 1010 is configured to implement functions of the processing unit 910, and the interface circuit 1020 is configured to implement functions of the transceiver unit 920.

It may be understood that the processor in embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor, or may be any conventional processor.

The method steps in embodiments of this application may be implemented in a hardware manner, or may be implemented in a manner of executing software instructions by the processor. The software instructions may include a corresponding software module. The software module may be stored in a random access memory, a flash memory, a read-only memory, a programmable read-only memory, an erasable programmable read-only memory, an electrically erasable programmable read-only memory, a register, a hard disk drive, a removable hard disk drive, a CD-ROM, or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a base station or a terminal. Certainly, the processor and the storage medium may exist in a base station or terminal as discrete components.

All or a part of the foregoing embodiments may be implemented by using software, hardware, firmware, or any combination thereof. When the software is used to implement embodiments, all or a part of embodiments may be implemented in a form of a computer program product. The computer program product includes one or more computer programs and instructions. When the computer programs or instructions are loaded and executed on a computer, all or a part of the procedures or functions in embodiments of this application are executed. The computer may be a general-purpose computer, a dedicated computer, a computer network, a base station, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired or wireless manner. The computer-readable storage medium may be any usable medium that can be accessed by the computer, or a data storage device, for example, a server or a data center, integrating one or more usable media. The usable medium may be a magnetic medium, for example, a floppy disk, a hard disk drive, or a magnetic tape, may be an optical medium, for example, a digital video disc, or may be a semiconductor medium, for example, a solid-state drive. The computer-readable storage medium may be a volatile storage medium or a non-volatile storage medium, or may include two types of storage media: the volatile storage medium and the non-volatile storage medium.

In various embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

In this application, "at least one" refers to one or more, and "a plurality of" refers to two or more than two. "And/or" describes an association relationship between associated objects, and represents that three relationships may exist. For example, A and/or B may represent the following cases: Only A exists, both A and B exist, and only B exists, where A and B may be singular or plural. In the text descriptions of this application, the character "/" usually indicates an "or" relationship between the associated objects. In a formula in this application, the character "/" indicates a "division" relationship between the associated objects.

It may be understood that various numbers in embodiments of this application are only used for differentiation for ease of description, and are not used to limit the scope of embodiments of this application. Sequence numbers of the foregoing processes do not mean execution sequences, and the execution sequences of the processes should be determined based on functions and internal logic of the processes.

What is claimed is:

1. A communication apparatus, comprising a processor and a memory, wherein the memory is configured to store computer instructions which, when executed by the processor, causes the apparatus to perform operations comprising:

receiving a request message from a core network element or a third-party network element in a mobile communications network via a transceiver unit of the apparatus, wherein the request message comprises path information and indicates a request for an analytics result;

determining block information based on step information and the path information; and sending, to the core network element or the third-party network element in the mobile communications network, the block information and an analytics result corresponding to the block information, wherein a coverage area of a block corresponding to the block information is smaller than a coverage area of a cell in the mobile communications network.

2. The apparatus according to claim 1, wherein the request message comprises identification information of a first terminal device, and the request message indicates a request for an analytics result of the first terminal device; and wherein the computer instructions, when executed by the processor, causes the apparatus further to:

obtain location information of the first terminal device from a location management network element by using the transceiver unit; and determine the block information based on the step information and the location information of the first terminal device, wherein the first terminal device is located in the coverage area of the block corresponding to the block information.

3. The apparatus according to claim 2, wherein the request message further comprises the step information.

4. The apparatus according to claim 1, wherein the block crosses one or more cells, or crosses one or more tracking areas (TAs).

5. The apparatus according to claim 1, wherein the step information indicates a radius of a circular area.

6. The apparatus according to claim 1, wherein the path information comprises a group of longitude and latitude information.

7. The apparatus according to claim 1, wherein the request message comprises the block information.

8. The apparatus according to claim 1, wherein the operations further comprise:

determining first data of a terminal device in the coverage area of the block corresponding to the block information; and determining the analytics result based on the first data.

9. The apparatus according to claim 1, wherein the apparatus is a core network element or a third-party network element in a mobile communications network.

10. A communication apparatus, comprising a processor and a memory, wherein the memory is configured to store computer instructions which, when executed by the processor, causes the apparatus to perform operations comprising:

sending a request message to a data analytics network element in a mobile communications network via a transceiver unit of the apparatus, wherein the request message comprises path information and indicates a request for an analytics result;

receiving, from the data analytics network element, block information and an analytics result corresponding to the block information, wherein the block information is determined by the data analytics network element based on step information and the path information; and a coverage area of a block corresponding to the block information is smaller than a coverage area of a cell in the mobile communications network.

11. The apparatus according to claim 10, wherein the block crosses one or more cells, or crosses one or more tracking areas (TAs).

12. The apparatus according to claim 10, wherein the step information indicates a radius of a circular area.

13. The apparatus according to claim 10, wherein the path information comprises a group of longitude and latitude information.

14. The apparatus according to claim 10, wherein the request message comprises the block information.

15. The apparatus according to claim 10, wherein the request message further comprises the step information.

16. The apparatus according to claim 10, wherein the analytics result is determined based on first data of a terminal device in the coverage area of the block corresponding to the block information.

17. A communication system, comprising a first communication apparatus and a second communication apparatus in a mobile communication network, wherein the first communication apparatus is configured to perform operations comprising:

sending a request message, wherein the request message comprises path information and indicates a request for an analytics result;

receiving block information and the analytics result corresponding to the block information; and the second communication apparatus is configured to perform operations comprising:

receiving the request message;

determining the block information based on step information and the path information; and sending the block information and the analytics result corresponding to the block information; wherein a coverage area of a block corresponding to the block information is smaller than a coverage area of a cell in the mobile communications network.

18. The system according to claim 17, wherein the block crosses one or more cells, or crosses one or more tracking areas (TAs).

19. The apparatus according to claim 17, wherein the step information indicates a radius of a circular area.

20. The apparatus according to claim 17, wherein the path information comprises a group of longitude and latitude information.

* * * * *